United States Patent
Hu et al.

(10) Patent No.: US 12,192,089 B2
(45) Date of Patent: Jan. 7, 2025

(54) METHOD FOR QUALITY OF EXPERIENCE MEASUREMENT AND COMMUNICATION APPARATUS

(71) Applicant: Huawei Technologies Co., Ltd., Shenzhen (CN)

(72) Inventors: Xingxing Hu, Shanghai (CN); Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 373 days.

(21) Appl. No.: 17/695,268

(22) Filed: Mar. 15, 2022

(65) Prior Publication Data

US 2022/0210031 A1    Jun. 30, 2022

Related U.S. Application Data

(63) Continuation of application No. PCT/CN2020/115307, filed on Sep. 15, 2020.

(30) Foreign Application Priority Data

Sep. 17, 2019    (CN) .......................... 201910877618.9

(51) Int. Cl.
*H04L 43/55*    (2022.01)
*H04W 24/02*    (2009.01)

(52) U.S. Cl.
CPC ............. *H04L 43/55* (2022.05); *H04W 24/02* (2013.01)

(58) Field of Classification Search
None
See application file for complete search history.

(56) References Cited

U.S. PATENT DOCUMENTS

| | | | |
|---|---|---|---|
| 2012/0311126 A1 | 12/2012 | Jadallah et al. | |
| 2016/0050124 A1 | 2/2016 | Vega et al. | |
| 2017/0048737 A1* | 2/2017 | Pao ........................ | H04L 5/006 |
| 2018/0034524 A1* | 2/2018 | Pao ....................... | H04L 1/1607 |
| 2018/0376394 A1 | 12/2018 | Hahn et al. | |
| 2021/0014791 A1* | 1/2021 | Freda ............... | H04W 52/0216 |

FOREIGN PATENT DOCUMENTS

| | | |
|---|---|---|
| CA | 2742038 A1 | 11/2012 |
| CN | 103385017 A | 11/2013 |
| CN | 103686834 A | 3/2014 |
| CN | 107659955 A | 2/2018 |

(Continued)

OTHER PUBLICATIONS

Huawei et al., "Introduction of QoE Measurement Collection for streaming services", 3GPP TSG-RAN WG2 Meeting#97, R2-1702254, Athens, Greece, Feb. 13-17, 2017, 3 pages.

(Continued)

*Primary Examiner* — Diane L Lo
(74) *Attorney, Agent, or Firm* — Slater Matsil, LLP

(57) ABSTRACT

This application provides a method for quality of experience QOE measurement and a communication apparatus. A network device configures configuration information for QOE measurement for a terminal device when signal quality is lower than a specific threshold. In addition, the terminal device may also perform QOE measurement or report a measurement result when the quality is lower than the specific threshold.

20 Claims, 8 Drawing Sheets

(56) References Cited

FOREIGN PATENT DOCUMENTS

| CN | 108370593 | A | 8/2018 |
|---|---|---|---|
| CN | 108476424 | A | 8/2018 |
| CN | 108521877 | A | 9/2018 |
| CN | 109155764 | A | 1/2019 |
| CN | 109413763 | A | 3/2019 |
| WO | 2014154263 | A1 | 10/2014 |
| WO | 2016119822 | A1 | 8/2016 |
| WO | 2019010606 | A1 | 1/2019 |

OTHER PUBLICATIONS

Ericsson, "QoE Measurement Collection in NR", 3GPP TSG RAN WG2 #106, R2-1906232, Reno, NV, US, May 13-17, 2019, 3 pages.

Nokia et al., "Consideration on QMC for steaming in UTRAN", 3GPP TSG-RAN WG2 Meeting #96, R2-168138, Reno, NV, US, Nov. 14-18, 2016, 4 pages.

China Unicom et al., "Motivation for WI Proposal on Quality of Experience (QoE) Measurement Collection for streaming services in E-UTRAN", 3GPP TSG RAN Meeting #75, RP-170434, Dubrovnik, Croatia, Mar. 6-9, 2017, 10 pages.

3GPP TS 36.413 V15.6.0 (Jul. 2019), 3rd Generation Partnership Project; Technical Specification Group Radio Access Network; Evolved Universal Terrestrial Radio Access Network (E-UTRAN); S1 Application Protocol (S1AP) (Release 15), 388 pages.

Ericsson, "Improved handling of QoE configuration", 3GPP TSG-RAN2 Meeting #100, R2-1712463, Reno, NV, US, Nov. 27-Dec. 1, 2017, 7 pages.

China Unicom et al., "New WI proposal: Quality of Experience (QoE) Measurement Collection for streaming services In E-UTRAN", 3GPP TSG RAN Meeting #76, RP-170956, West Palm Beach, FL, US, Jun. 5-8, 2017, 5 pages.

Ericsson, "Introduction of QoE Measurement Collection for MTSI services", 3GPP TSG-RAN WG6 Meeting #7, R6-180005, Athens, Greece, Feb. 26-Mar. 2, 2018, 12 pages.

* cited by examiner

METHOD FOR QUALITY OF EXPERIENCE MEASUREMENT AND COMMUNICATION APPARATUS

CROSS-REFERENCE TO RELATED APPLICATIONS

This application is a continuation of International Application No. PCT/CN2020/115307, filed on Sep. 15, 2020, which claims priority to Chinese Patent Application No. 201910877618.9, filed on Sep. 17, 2019. The disclosures of the aforementioned applications are hereby incorporated by reference in their entireties.

TECHNICAL FIELD

This application relates to the communication field, and more specifically, to a method for quality of experience measurement and a communication apparatus.

BACKGROUND

To better optimize a network and improve user experience, an operator may perform quality of experience (QOE) measurement collection. The QOE measurement collection is also referred to as application layer measurement collection. Configuration information for QOE measurement may be sent by a core network (CN) or an operation administration and maintenance (OAM) entity or device to a base station, and the base station then sends the configuration information to user equipment (UE). The UE performs QOE measurement based on the configuration information, to obtain a measurement result, and sends the measurement result to the base station.

Because an amount of data related to QOE measurement is relatively large, for example, there is a large amount of configuration information for QOE measurement and a corresponding measurement result, overheads of air interface signaling are relatively large. Therefore, the overheads of air interface signaling caused by QOE measurement need to be reduced.

SUMMARY

This application provides a method for QOE measurement and a communication apparatus, to reduce overheads of air interface signaling.

According to a first aspect, a method for quality of experience QOE measurement is provided, and includes: A network device receives first configuration information and first event information, where the first configuration information includes configuration information for QOE measurement, and the first event information is used to indicate a first event. When the first event is met, the network device sends the first configuration information to a terminal device. The first event includes one or both of the following: The network device determines that quality that is of a signal sent by the network device and that is obtained by the terminal device through measurement is lower than a first threshold, and quality that is of a signal sent by the terminal device and that is obtained by the network device through measurement is lower than a second threshold.

It should be understood that, when the first event is not met, the network device does not send the first configuration information to the terminal device.

It should be further understood that, the first threshold and the second threshold may be the same, or may be different.

In addition, the first threshold and the second threshold may be configured in advance, or may be carried by using the first configuration information.

When QOE measurement collection is performed, the network device needs to configure the configuration information for QOE measurement for the terminal device. However, if the network device directly sends the received configuration information for QOE measurement to the terminal device, overheads of air interface signaling are relatively large. The QOE measurement collection aims to improve service experience of a user. Usually, the service experience is greatly affected when signal quality is relatively poor, and the service experience is slightly affected when the signal quality is relatively good. Therefore, compared with relatively large overheads of air interface signaling caused by directly configuring the configuration information for QOE measurement, it may be considered that QOE measurement collocation is performed only when the signal quality is relatively poor, and QOE measurement collection is not performed when the signal quality is relatively good. According to the method provided in this application, after obtaining the configuration information for QOE measurement, the network device does not directly send the configuration information for QOE measurement to the terminal device, but sends the configuration information for QOE measurement to the terminal device when the quality that is of the signal sent by the terminal device and that is obtained by the network device through measurement is lower than a specific threshold or quality of a signal received by the terminal device is lower than a specific threshold, so that overheads of air interface signaling can be reduced.

With reference to the first aspect, in some implementations of the first aspect, the first configuration information is further used to indicate a second event, and the second event is that the quality that is of the signal sent by the network device and that is obtained by the terminal device through measurement is lower than a third threshold.

The first configuration information is used to indicate a radio resource control (RRC) layer of the terminal device to determine, based on the second event, whether to send the configuration information for QOE measurement to an upper layer of the RRC layer, or the first configuration information is used to indicate the terminal device to determine, based on the second event, whether to perform QOE measurement based on the configuration information for QOE measurement.

In other words, the second event is used by the RRC layer of the terminal device to determine whether to send the configuration information for QOE measurement to the upper layer of the RRC layer, or the second event is used by the terminal device to determine whether to perform QOE measurement based on the configuration information for QOE measurement.

It should be understood that, the third threshold may be equal to or different from the first threshold and/or the second threshold. In addition, the third threshold may be configured in advance, or may be carried by using the first configuration information.

When signal quality is relatively good, impact on service experience is relatively small. Therefore, only when the signal quality is lower than a specific threshold, the upper layer of the RRC layer needs to perform QOE measurement. According to this solution, the RRC layer of the terminal device may send the configuration information for QOE measurement to the upper layer of the RRC layer only when the signal quality is lower than the specific threshold.

Therefore, the upper layer of the RRC layer of the terminal device performs QOE measurement only when the signal quality is lower than the specific threshold. Alternatively, according to this solution, regardless of signal quality, the RRC layer of the terminal device may directly send the configuration information for QOE measurement to the upper layer of the RRC layer. However, the upper layer of the RRC layer of the terminal device performs QOE measurement only when the signal quality is lower than the specific threshold. In this way, unnecessary QOE measurement can be avoided, and further, reporting of QOE measurement results can be correspondingly reduced, so as to reduce signaling overheads.

With reference to the first aspect, in some implementations of the first aspect, the first configuration information is further used to indicate a third event, and the third event is that the quality that is of the signal sent by the network device and that is obtained by the terminal device through measurement is lower than a fourth threshold.

The first configuration information is used to indicate the terminal device to determine, based on the third event, whether to report a measurement result, and the measurement result is obtained by the terminal device by performing QOE measurement based on the configuration information for QOE measurement. That is, the third event is used by the terminal device to determine whether to report the measurement result obtained by performing QOE measurement based on the configuration information for QOE measurement.

It should be understood that, the fourth threshold may be equal to or different from one or more of the first threshold, the second threshold, and the third threshold. In addition, the fourth threshold may be configured in advance, or may be carried by using the first configuration information.

According to this solution, when signal quality is relatively good, impact on service experience is relatively small. Therefore, the terminal device may not report the measurement result when the signal quality is higher than or equal to a specific threshold, but may report the measurement result only when the signal quality is lower than the specific threshold, so that signaling overheads can be reduced.

With reference to the first aspect, in some implementations of the first aspect, the method may further include: The network device receives indication information sent by the terminal device, where the indication information is used to indicate that the terminal device has the measurement result, and the measurement result is obtained by the terminal device by performing QOE measurement based on the configuration information for QOE measurement. The network device sends configuration information of a first signaling radio bearer (signal radio bearer, SRB) to the terminal device, where the first SRB is used to send the measurement result.

According to this solution, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

With reference to the first aspect, in some implementations of the first aspect, the method may further include: The network device receives the measurement result reported by the terminal device by using the first SRB.

According to a second aspect, a method for quality of experience QOE measurement is provided, and includes: A network device receives first configuration information; and sends the first configuration information to a terminal device.

The first configuration information includes configuration information for QOE measurement, and the first configuration information is further used to indicate one or both of a second event and a third event. The first configuration information is used to indicate a radio resource control RRC layer of the terminal device to determine, based on the second event, whether to send the configuration information for QOE measurement to an upper layer of the RRC layer, or the first configuration information is used to indicate the terminal device to determine, based on the second event, whether to perform QOE measurement based on the configuration information for QOE measurement; the first configuration information is used to indicate the terminal device to determine, based on the third event, whether to report a measurement result, and the measurement result is obtained by performing QOE measurement based on the configuration information for QOE measurement; and the second event is that quality that is of a signal sent by the network device and that is obtained by the terminal device through measurement is lower than a third threshold, and the third event is that the quality that is of the signal sent by the network device and that is obtained by the terminal device through measurement is lower than a fourth threshold.

According to the method provided in this application, the network device may configure one or both of the second event and the third event for the terminal device. When the second event is configured for the terminal device, the RRC layer of the terminal device may send the configuration information for QOE measurement to the upper layer of the RRC layer only when signal quality is lower than a specific threshold. Therefore, the upper layer of the RRC layer of the terminal device performs QOE measurement only when the signal quality is lower than the specific threshold. Alternatively, the RRC layer of the terminal device may directly send the configuration information for QOE measurement to the upper layer of the RRC layer. However, the upper layer of the RRC layer of the terminal device performs QOE measurement only when signal quality is lower than a specific threshold. In this way, QOE measurement can be correspondingly reduced, and further, reporting of QOE measurement results can be correspondingly reduced, so as to reduce signaling overheads. When the third event is configured for the terminal device, the terminal device may not report the measurement result when signal quality is higher than or equal to a specific threshold, but may report the measurement result only when the signal quality is lower than the specific threshold, so that signaling overheads can be reduced.

With reference to the second aspect, in some implementations of the second aspect, the method may further include: The network device receives indication information sent by the terminal device, where the indication information is used to indicate that the terminal device has the measurement result. The network device sends configuration information of a first signaling radio bearer SRB to the terminal device, where the first SRB is used to send the measurement result.

According to this solution, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

With reference to the second aspect, in some implementations of the second aspect, the method may further include: The network device receives the measurement result reported by the terminal device by using the first SRB.

According to a third aspect, a method for QOE measurement is provided, and the method includes: A network device generates fourth event information, and sends the fourth event information to a terminal device. The fourth event information is used to indicate a fourth event, and the fourth event is that quality that is of a signal sent by the network device and that is obtained by the terminal device through measurement is lower than a fifth threshold.

The fourth event information is used to indicate whether the terminal device performs QOE measurement based on the fourth event. That is, the fourth event is used by the terminal device to determine whether to perform QOE measurement.

Optionally, the fourth event information may be sent by using a broadcast message, or may be sent by using an RRC message or other signaling. This is not limited in this application.

According to the method provided in this application, the network device may configure the fourth event for the terminal device, so that the terminal device can perform QOE measurement only when signal quality is lower than a specific threshold, and does not perform QOE measurement when the signal quality is higher than or equal to the specific threshold. In this way, unnecessary QOE measurement can be avoided, reporting of measurement results can be correspondingly reduced, and signaling overheads can be reduced.

With reference to the third aspect, in some implementations of the third aspect, the method may further include: The network device generates third event information, and sends the third event information to the terminal device. The third event information is used to indicate a third event, and the third event is that the quality that is of the signal sent by the network device and that is obtained by the terminal device through measurement is lower than a fourth threshold.

The third event information is used to indicate whether the terminal device reports the measurement result based on the third event, and the measurement result is obtained by the terminal device by performing QOE measurement based on configuration information for QOE measurement. That is, the third event is used by the terminal device to determine whether to report the measurement result obtained by performing QOE measurement based on the configuration information for QOE measurement.

Optionally, the configuration information for QOE measurement may be preconfigured by the network device or may be configuration by default (for example, specified in a protocol). This is not limited in this application.

Optionally, the third event information and the fourth event information may be carried by using same signaling or a same message, or may be carried by using different signaling or different messages. This is not limited in this application.

It should be understood that, the fifth threshold may be equal to or different from the fourth threshold.

According to this solution, when signal quality is relatively good, impact on service experience is relatively small. Therefore, the terminal device may not report the measurement result when the signal quality is higher than or equal to a specific threshold, but may report the measurement result only when the signal quality is lower than the specific threshold, so that signaling overheads can be reduced.

With reference to the third aspect, in some implementations of the third aspect, the method may further include: The network device receives indication information sent by the terminal device, where the indication information is used to indicate that the terminal device has the measurement result, and the measurement result is obtained by the terminal device by performing QOE measurement based on the configuration information for QOE measurement. The network device sends configuration information of a first SRB to the terminal device, where the first SRB is used to send the measurement result.

According to this solution, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

With reference to the third aspect, in some implementations of the third aspect, the method may further include: The network device receives the measurement result reported by the terminal device by using the first SRB.

According to a fourth aspect, a method for measurement reporting is provided, and includes: A network device receives indication information sent by a terminal device, where the indication information is used to indicate that the terminal device has a measurement result, and the measurement result is obtained by the terminal device by performing MDT measurement based on configuration information for logged minimization of drive-tests (MDT) technology measurement. The network device sends configuration information of a second SRB to the terminal device, where the second SRB is used to send the measurement result.

According to the method provided in this application, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

With reference to the fourth aspect, in some implementations of the fourth aspect, the method may further include: The network device receives the measurement result reported by the terminal device by using the second SRB.

According to a fifth aspect, a method for quality of experience QOE measurement is provided, and includes: A terminal device receives first configuration information sent by a first network device, where the first configuration information includes configuration information for QOE measurement, the first configuration information is further used to indicate a second event, and the second event is that quality that is of a signal sent by a network device and that is obtained by the terminal device through measurement is lower than a third threshold. When the second event is met, a radio resource control RRC layer of the terminal device sends the configuration information for QOE measurement to an upper layer of the RRC layer, and the upper layer of the RRC layer performs QOE measurement based on the configuration information for QOE measurement, to obtain a measurement result.

According to the method provided in this application, the RRC layer of the terminal device may send the configuration information for QOE measurement to the upper layer of the RRC layer only when signal quality is lower than a specific threshold. Therefore, the upper layer of the RRC layer of the terminal device performs QOE measurement only when the signal quality is lower than the specific threshold. In this way, unnecessary QOE measurement can be avoided, and further, reporting of QOE measurement results can be correspondingly reduced, so as to reduce signaling overheads.

With reference to the fifth aspect, in some implementations of the fifth aspect, the first configuration information is further used to indicate a third event, and the third event is that the quality that is of the signal sent by the network device and that is obtained by the terminal device through measurement is lower than a fourth threshold. In addition, the method further includes: When the third event is met, the terminal device reports the measurement result to a second network device.

According to this solution, the terminal device may not report the measurement result when signal quality is higher than or equal to a specific threshold, but may report the measurement result only when the signal quality is lower than the specific threshold, so that signaling overheads can be reduced.

With reference to the fifth aspect, in some implementations of the fifth aspect, the method further includes: The terminal device sends indication information to the second network device, where the indication information is used to indicate that the terminal device has the measurement result. The terminal device receives configuration information that is of a first signaling radio bearer SRB and that is sent by the second network device. The terminal device sets up the first SRB based on the configuration information of the first SRB. The terminal device reports the measurement result to the second network device by using the first SRB.

According to this solution, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

According to a sixth aspect, a method for quality of experience QOE measurement is provided, and includes: A terminal device receives first configuration information sent by a first network device, where the first configuration information includes configuration information for QOE measurement, the first configuration information is further used to indicate a second event, and the second event is that quality that is of a signal sent by a network device and that is obtained by the terminal device through measurement is lower than a third threshold. When the second event is met, the terminal device performs QOE measurement based on the configuration information for QOE measurement, to obtain a measurement result.

According to the method provided in this application, an upper layer of an RRC layer of the terminal device performs QOE measurement only when signal quality is lower than a specific threshold. In this way, unnecessary QOE measurement can be avoided, and further, reporting of QOE measurement results can be correspondingly reduced, so as to reduce signaling overheads.

With reference to the sixth aspect, in some implementations of the sixth aspect, the first configuration information is further used to indicate a third event, and the third event is that the quality that is of the signal sent by the network device and that is obtained by the terminal device through measurement is lower than a fourth threshold. In addition, the method further includes: When the third event is met, the terminal device reports the measurement result to a second network device.

According to this solution, the terminal device may not report the measurement result when signal quality is higher than or equal to a specific threshold, but may report the measurement result only when the signal quality is lower than the specific threshold, so that signaling overheads can be reduced.

With reference to the sixth aspect, in some implementations of the sixth aspect, the method further includes: The terminal device sends indication information to the second network device, where the indication information is used to indicate that the terminal device has the measurement result. The terminal device receives configuration information that is of a first signaling radio bearer SRB and that is sent by the second network device. The terminal device sets up the first SRB based on the configuration information of the first SRB. The terminal device reports the measurement result to the second network device by using the first SRB.

According to this solution, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

According to a seventh aspect, a method for quality of experience QOE measurement is provided, and includes: A terminal device receives first configuration information sent by a first network device, where the first configuration information includes configuration information for QOE measurement, the first configuration information is further used to indicate a third event, and the third event is that quality that is of a signal sent by a network device and that is obtained by the terminal device through measurement is lower than a fourth threshold. The terminal device performs QOE measurement based on the configuration information for QOE measurement, to obtain a measurement result. When the third event is met, the terminal device reports the measurement result to a second network device.

According to the method provided in this application, the terminal device may not report the measurement result when signal quality is higher than or equal to a specific threshold, but may report the measurement result only when the signal quality is lower than the specific threshold, so that signaling overheads can be reduced.

With reference to the seventh aspect, in some implementations of the seventh aspect, before the terminal device reports the measurement result to the second network device, the method further includes: The terminal device sends indication information to the second network device, where the indication information is used to indicate that the terminal device has the measurement result. The terminal device receives configuration information that is of a first signaling radio bearer SRB and that is sent by the second network device. The terminal device sets up the first SRB based on the configuration information of the first SRB. The terminal device reports the measurement result to the second network device by using the first SRB.

According to this solution, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

According to an eighth aspect, a method for QOE measurement is provided, and the method includes: A terminal device obtains fourth event information, where the fourth event information is used to indicate a fourth event, and the fourth event is that quality that is of a signal sent by a network device and that is obtained by the terminal device through measurement is lower than a fifth threshold. When the fourth event is met, the terminal device performs QOE measurement.

Optionally, the fourth event information may be sent by using a broadcast message, or may be sent by using an RRC message or other signaling. This is not limited in this application.

According to the method provided in this application, the terminal device may perform QOE measurement only when signal quality is lower than a specific threshold, and may not perform QOE measurement when the signal quality is higher than or equal to the specific threshold. In this way, unnecessary QOE measurement can be avoided, reporting of measurement results can be correspondingly reduced, and signaling overheads can be reduced.

With reference to the eighth aspect, in some implementations of the eighth aspect, the terminal device obtains third event information, where the third event information is used to indicate a third event, and the third event is that the quality that is of the signal sent by the network device and that is obtained by the terminal device through measurement is lower than a fourth threshold. When the third event is met, the terminal device reports a measurement result to a second network device, where the measurement result is obtained by the terminal device by performing QOE measurement.

Optionally, the third event information and the fourth event information may be carried by using same signaling or a same message, or may be carried by using different signaling or different messages. This is not limited in this application.

According to this solution, the terminal device may not report the measurement result when signal quality is higher than or equal to a specific threshold, but may report the measurement result only when the signal quality is lower than the specific threshold, so that signaling overheads can be reduced.

With reference to the eighth aspect, in some implementations of the eighth aspect, the method further includes: The terminal device sends indication information to the second network device, where the indication information is used to indicate that the terminal device has the measurement result. The terminal device receives configuration information that is of a first signaling radio bearer SRB and that is sent by the second network device. The terminal device sets up the first SRB based on the configuration information of the first SRB. The terminal device reports the measurement result to the second network device by using the first SRB.

According to this solution, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced. According to a ninth aspect, a method for measurement reporting is provided, and includes: A terminal device sends indication information to a network device, where the indication information is used to indicate that the terminal device has a measurement result, and the measurement result is obtained by the terminal device by performing MDT measurement based on configuration information for logged MDT measurement. The terminal device receives configuration information that is of a second signaling radio bearer SRB and that is sent by a second network device. The terminal device sets up the second SRB based on the configuration information of the second SRB. The terminal device reports the measurement result to the second network device by using the second SRB.

According to the method provided in this application, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

According to a ninth aspect, a method for measurement reporting is provided, and includes: A terminal device sends indication information to a network device, where the indication information is used to indicate that the terminal device has a measurement result, and the measurement result is obtained by the terminal device by performing MDT measurement based on configuration information for logged minimization of drive-tests (MDT) technology measurement. The terminal device receives configuration information that is of a second SRB and that is sent by the network device. The terminal device sets up the second SRB based on the configuration information of the second SRB. The terminal device sends the measurement result by using the second SRB.

According to the method provided in this application, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

According to a tenth aspect, a communication apparatus is provided. The communication apparatus includes modules or units configured to perform the method according to any one of the first aspect to the fourth aspect and the possible implementations of the first aspect to the fourth aspect.

According to an eleventh aspect, a communication apparatus is provided, and includes a processor. The processor is coupled to a memory, and may be configured to execute instructions in the memory, to implement the method according to any one of the first aspect to the fourth aspect and the possible implementations of the first aspect to the fourth aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip disposed in the network device. When the communication apparatus is the chip disposed in the network device, the communication interface may be an input/output interface.

Optionally, the transceiver may be a transceiver circuit. Optionally, the input/output interface may be an input/output circuit.

According to a twelfth aspect, a communication apparatus is provided. The communication apparatus includes modules or units configured to perform the method according to any one of the fifth aspect to the ninth aspect and the possible implementations of the fifth aspect to the ninth aspect.

According to a thirteenth aspect, a communication apparatus is provided, and includes a processor. The processor is coupled to a memory, and may be configured to execute instructions in the memory, to implement the method according to any one of the fifth aspect to the ninth aspect and the possible implementations of the fifth aspect to the ninth aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in the terminal device. When the communication apparatus is the chip disposed in the terminal device, the communication interface may be an input/output interface.

Optionally, the transceiver may be a transceiver circuit. Optionally, the input/output interface may be an input/output circuit.

According to a fourteenth aspect, a processor is provided, and includes an input circuit, an output circuit, and a processing circuit. The processing circuit is configured to: receive a signal through the input circuit, and transmit a signal through the output circuit, to enable the processor to perform the method according to any one of the first aspect to the ninth aspect and the possible implementations of the first aspect to the ninth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in the embodiments of this application.

According to a fifteenth aspect, a processing apparatus is provided, and includes a processor and a memory. The processor is configured to read instructions stored in the memory, and may receive a signal by using a receiver, and transmit a signal by using a transmitter, to perform the method according to any one of the first aspect to the ninth aspect and the possible implementations of the first aspect to the ninth aspect.

Optionally, there are one or more processors and one or more memories.

Optionally, the memory may be integrated into the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that, a related data exchange process, for example, sending of indication information may be a process of outputting the indication information from the processor, and receiving of indication information may be a process of receiving the indication information by the processor. Specifically, data output by the processor may be output to the transmitter, and input data received by the processor may be from the receiver. The transmitter and the receiver may be collectively referred to as a transceiver.

The processing apparatus according to the fifteenth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a sixteenth aspect, a computer program product is provided. The computer program product includes a computer program (which may also be referred to as code or an instruction). When the computer program is run, a computer is enabled to perform the method according to any one of the first aspect to the ninth aspect and the possible implementations of the first aspect to the ninth aspect.

According to a seventeenth aspect, a computer-readable medium is provided. The computer-readable medium stores a computer program (which may also be referred to as code or an instruction). When the computer program is run on a computer, the computer is enabled to perform the method according to any one of the first aspect to the ninth aspect and the possible implementations of the first aspect to the ninth aspect.

According to an eighteenth aspect, a communication system is provided. The communication system includes the foregoing terminal device and network device.

DETAILED DESCRIPTION OF ILLUSTRATIVE EMBODIMENTS

The following describes technical solutions in this application with reference to the accompanying drawings.

The technical solutions in embodiments of this application may be applied to various communication systems, for example, a long term evolution (LTE) system, a 5th generation (5G) system, a new radio (NR) system, and a future mobile communication system.

Figure 1:
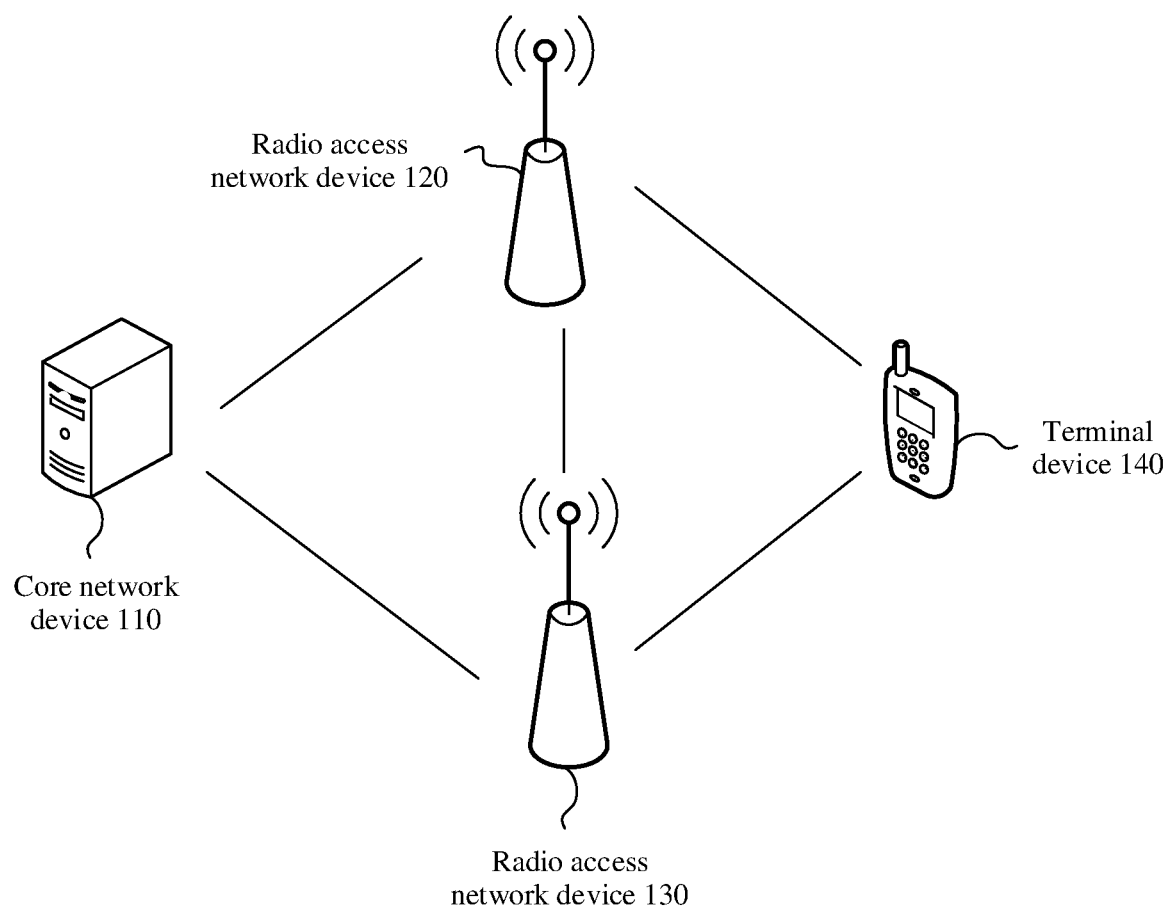
FIG. 1 is a schematic diagram of a communication system to which an embodiment of this application is applied.

FIG. 1 is a schematic diagram of an architecture of a mobile communication system to which an embodiment of this application is applied. As shown in FIG. 1, the mobile communication system includes a core network device 110, a radio access network (radio access network, RAN) device 120, and at least one terminal device (for example, a terminal device 140 in FIG. 1). Optionally, one terminal device may alternatively communicate with a plurality of radio access network devices, that is, dual-connectivity (DC). For example, the terminal device 140 may communicate with a radio access network device 120 and a radio access network device 130. It should be understood that a plurality of radio access network devices communicating with a same terminal device may be radio access network devices of a same standard (for example, radio access network devices in a 5G network), or may be radio access network devices of different standards (for example, one is a radio access network device in a 4G network, and another one is a radio access network device in a 5G network).

The terminal device is connected to the radio access network device in a wireless manner, and the radio access network device is connected to the core network device in a wireless or wired manner. The core network device and the radio access network device may be different independent physical devices, or a function of the core network device and a logical function of the radio access network device may be integrated into one physical device, or a part of a function of the core network device and a part of a function of the radio access network device may be integrated into one physical device. The terminal device may be located at a fixed location, or may be mobile. FIG. 1 is only a schematic diagram. The communication system may further include another network device, for example, may further include a wireless relay device and a wireless backhaul device, which are not shown in FIG. 1. Quantities of core network devices, radio access network devices, and terminal devices included in the mobile communication system are not limited in the embodiments of this application. It should be understood that, the core network device in FIG. 1 may also be replaced with an OAM.

The radio access network device is a device that connects the terminal device to a wireless network. The radio access network device may be a NodeB NodeB, an evolved NodeB (evolved NodeB, eNB), a base station (gNodeB, gNB) in a 5G mobile communication system, a transmission point, a base station in a future mobile communication system, an access node in a wireless fidelity (Wi-Fi) system, or one antenna panel or a group of antenna panels (including a plurality of antenna panels) of a base station in the 5G system. Alternatively, the radio access network device may be a network node that constitutes a gNB or a transmission point, for example, a baseband unit (BBU), a distributed unit (DU), a centralized unit (CU), a centralized unit-control plane (CU-CP), or a centralized unit-user plane (CU-UP). A specific technology and a specific device form used by the radio access network device are not limited in the embodiments of this application. In some deployments, the gNB may include a CU and a DU. One CU may be connected to one DU, or a plurality of DUs share one CU, to reduce costs and facilitate network expansion. The CU implements some functions of the gNB, and the DU implements some functions of the gNB. For example, the CU is responsible for processing a non-real-time protocol and service, to implement functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. Division of the CU and the DU may be performed based on the protocol stack. The protocol stack division manner is not completely limited in the embodiments of this application, and there may be another division manner. For details, refer to TR 38.801 v14.0.0.

The CU and the DU are connected through an F1 interface. The CU indicates that the gNB is connected to the core network through an Ng interface. Further, the centralized unit CU may be further divided into a control plane (CU-CP) and a user plane (CU-UP). The CU-CP is responsible for a control plane function, and mainly includes RRC and a packet data convergence protocol control (PDCP-C) plane. The PDCP-C is mainly responsible for at least one function of data encryption and decryption, integrity protection, data transmission, and the like on a control plane. The CU-UP is responsible for a user plane function, and mainly includes a service data adaptation protocol (SDAP) and a packet data convergence protocol user (PDCP-U) plane. The SDAP is mainly responsible for processing data of a core network and mapping a flow to a bearer. The PDCP-U is mainly responsible for at least one function of encryption and decryption, integrity protection, header compression, serial number maintenance, data transmission, and the like on a data plane. The CU-CP is connected to the CU-UP through an E1 interface. The CU-CP indicates that the gNB is connected to the core network through an Ng interface. The CU-CP is connected to the DU through an F1-C (control plane) interface. The CU-UP is connected to the DU through an F1-U (user plane) interface. Certainly, in another possible implementation, the PDCP-C is alternatively in the CU-UP.

The gNB may further include an active antenna unit (AAU). The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that a network device may be a device including one or more of a CU node, a DU node, a CU-CP node, a CU-UP node, and an AAU node. In addition, the CU may be used as a network device in an access network, or may be used as a network device in a core network (CN). This is not limited in this application.

The terminal device may also be referred to as a terminal, user equipment (UE), a mobile station (MS), a mobile terminal (MT), or the like. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like. A specific technology and a specific device form used by the terminal device are not limited in the embodiments of this application.

The radio access network device and the terminal device may be deployed on land, including being deployed indoor or outdoor, or being handheld or vehicle-mounted; may be deployed on water; or may be deployed on an airplane, a balloon, and a satellite in the air. Application scenarios of the radio access network device and the terminal device are not limited in the embodiments of this application.

In the embodiments of this application, unless otherwise specified, all network devices (for example, a first network device, a second network device, and the network device in the following description) are referred to as radio access network devices.

In addition, it should be understood that, the terminal device in this application may be an apparatus, a chip, a circuit, or the like having a function of the terminal device. The network device is an apparatus, a chip, a circuit, or the like having a function of the network device.

The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the method provided in the embodiments of this application may be performed by the terminal device, the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

For ease of understanding this application, some related concepts are first described.

A basic idea of a minimization of drive-tests (MDT) technology is that an operator replaces some conventional drive test work with measurement reporting that is performed by a commercial terminal device of a subscribed user, to automatically collect measurement data of the terminal device, to detect and optimize a problem and a fault in the wireless network. Measurement types of the conventional MDT technology may be classified into the following types:

1. Signal level measurement: A terminal device measures a signal level of a radio signal, and reports a measurement result to a network device or a network device controller.

2. Quality of service (QoS) measurement: Usually, a network device performs QoS measurement. For example, the network device may measure a traffic volume of a service, a throughput of the service, a service delay, and the like. In addition, a terminal device may alternatively perform QoS measurement. For example, the terminal device may measure an uplink processing delay. Alternatively, the terminal device and the network device may jointly perform QoS measurement, for example, may perform air interface delay measurement, that is, measure a time period from time when a data packet passes through a service data adaptation protocol (SDAP)/packet data convergence protocol (PDCP) layer of the network device to time when the data packet arrives at an SDAP/PDCP layer of the terminal device.

3. Accessibility measurement: A terminal device logs information about an RRC connection setup failure, and reports the information to a network device or a network device controller.

MDT includes logged MDT (logged MDT) and immediate MDT. The immediate MDT is mainly measurement for a terminal device in an RRC connected state (RRC_CON- NECTED). The logged MDT is mainly measurement for a terminal device in an idle state (RRC_IDLE) or a terminal device in an RRC inactive state (RRC_INACTIVE). For example, the terminal device in the idle state or the terminal device in the inactive state performs measurement on a cell of a frequency corresponding to a cell on which the terminal device is currently camped and an inter-frequency/inter-system neighboring cell corresponding to broadcast cell reselection in the cell on which the terminal device is currently camped. The immediate MDT is usually used to measure signal quality of a current serving cell, a data amount of the terminal device, an IP throughput, a packet transmission delay, a packet loss rate, a processing delay, and the like. The logged MDT is usually measurement on received signal strength by the terminal device.

In the two scenarios, the network device initiates MDT measurement collection tasks. One is to initiate signaling-based MDT (signaling-based MDT) and the other is to initiate management-based MDT (management-based MDT). The signaling-based MDT is MDT for a specific terminal device. Specifically, the network device receives, from a core network device, a message for performing MDT on a terminal device, and then the network device initiates MDT measurement for the specific terminal device. The management-based MDT is not MDT for a specific terminal device. Specifically, the network device receives a message for performing MDT from an OAM, and then the network device selects, according to a specific policy, a terminal device from terminal devices in the network device to perform MDT measurement. For the signaling-based MDT, unless a user has agreed to perform MDT, the core network device does not initiate the signaling-based MDT for the terminal device. For the management-based MDT, when selecting a terminal device, the network device may consider whether the terminal device agrees to perform MDT. For example, only those terminal devices that have agreed to perform MDT are selected to perform MDT measurement. For example, the core network device may notify the network device whether a terminal device agrees to perform MDT. For example, the core network device may further notify the network device a list of public land mobile networks (public land mobile networks, PLMNs) in which the management-based MDT is performed. The two types of MDT may both include logged MDT and immediate MDT. For the signaling-based MDT, the core network device notifies the network device of some MDT configuration information and an IP address of a trace collection entity (TCE). The MDT configuration information may include one or more of the following: an MDT activation type (for example, immediate MDT only, logged MDT only, or immediate MDT and Trace), an MDT area range, an MDT mode, a configuration parameter of a corresponding mode (for example, a measurement event of the immediate MDT or a logged interval and duration of the logged MDT), and a list of public land mobile networks (PLMNs) in which the signaling-based MDT is performed.

For the logged MDT, when the terminal device is in the connected state, the network device configures, for the terminal device, related configuration for logged MDT measurement, for example, notifies, by using an RRC message, the related configuration for logged MDT. When the terminal device enters the idle state or inactive state, the terminal device logs a corresponding measurement result based on corresponding configuration. Then, when initiating an RRC connection to the network device, the terminal device carries one piece of indication information in an RRC message, to indicate that the terminal device currently logs a measurement result of the logged MDT. The network device may send a request to the terminal device to log an MDT log, and the terminal device then reports the measurement result of the logged MDT to a network side. For example, the indication information is carried in an RRC setup complete (RRCSetupComplete) message. Then, the network device requests, in a UE information request (UEInformationRequest), the terminal device to transmit the MDT log (where the message carries one piece of request indication information, to indicate the terminal device to upload the MDT log). Then, the terminal device uploads the MDT log to the network device in a UE information response (UEInformationResponse). It should be noted that, a network device that delivers the related configuration for logged MDT measurement to the terminal device and a network device to which the terminal device reports the measurement result of the logged MDT are not a same network device.

For some streaming services or voice services, for example, a streaming media service, a multimedia technical service (MTSI) for an IP multimedia subsystem (IMS), pure signal quality cannot reflect user experience when a user uses the services. The operator wants to know user experience, so as to better optimize a network and improve user experience. This type of measurement collection is referred to as QOE measurement collection, or may be referred to as application layer measurement collection. This type of measurement is also initiated by using the signaling-based MDT and the management-based MDT. Specifically, the network device receives configuration information for the measurement from the core network device or the OAM (for example, the configuration information includes application layer measurement configuration information for the terminal device, some area range information for notifying the network device to perform QOE measurement, and services on which QOE measurement is performed, where the application layer measurement configuration information is sent to the network device in a transparent container manner). The network device sends a part of content in the configuration information (for example, the application layer measurement configuration information and the services on which QOE measurement is performed) to the terminal device by using the RRC message. After receiving measurement results of an application layer from an upper layer of the terminal device, an RRC layer of the terminal device sends the measurement results to the network device (for example, the measurement results are encapsulated in a transparent container and sent to the network device).

Because an amount of data related to QOE measurement is relatively large, for example, there is a large amount of configuration information for QOE measurement and a corresponding measurement result, an air interface load is relatively large. Therefore, the air interface load caused by QOE measurement needs to be reduced.

In view of this, this application provides a plurality of methods for QOE measurement, to reduce overheads of air interface signaling. The following separately describes the methods.

It should be noted that, values of a first threshold, a second threshold, a third threshold, and a fourth threshold in the methods described below are not limited in this application. All or some of the thresholds may be equal, or the thresholds may be different.

Figure 2:
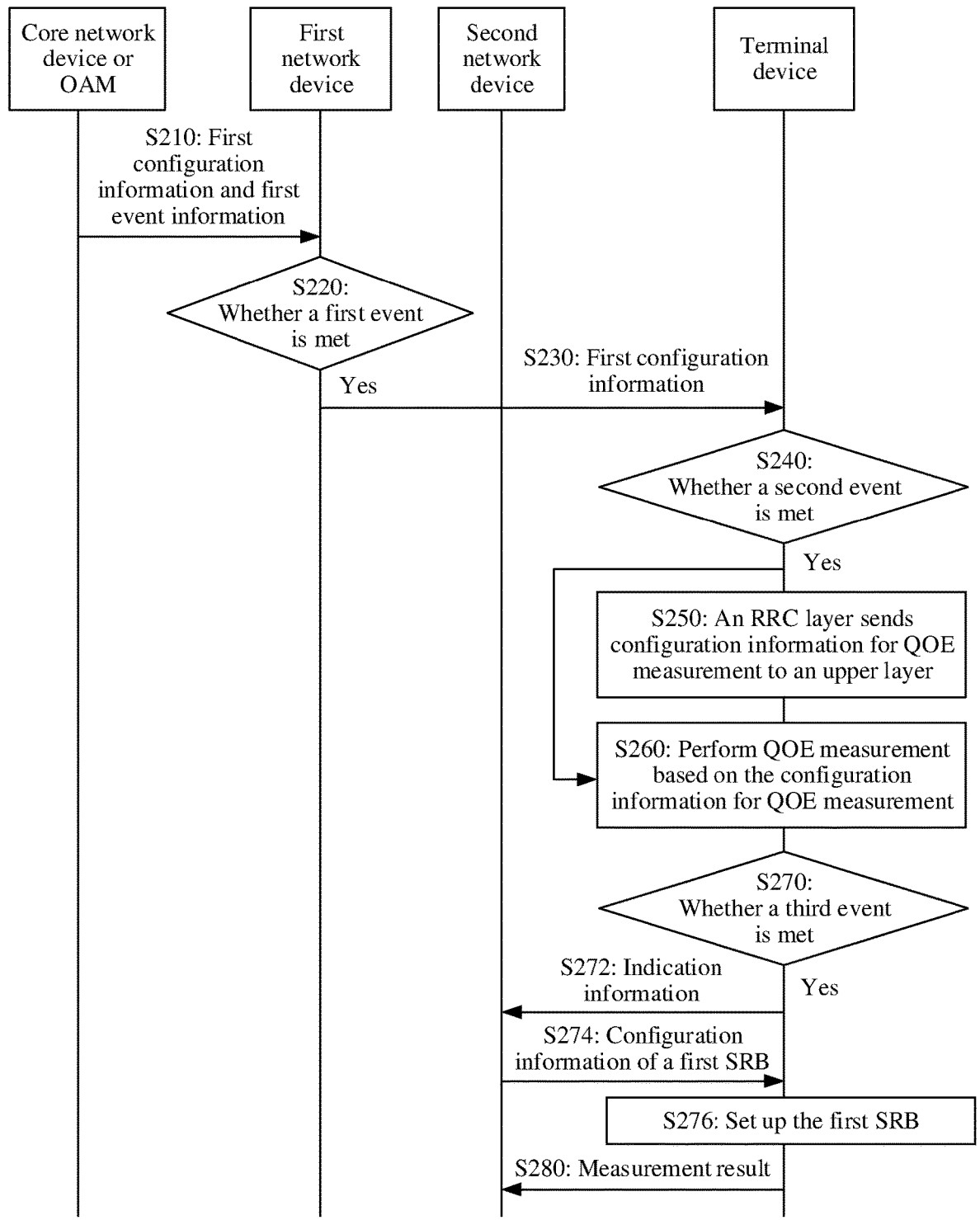
FIG. 2 is a schematic flowchart of a method for QOE measurement according to this application.

FIG. 2 is a schematic flowchart of a method for QOE measurement according to this application. As shown in FIG. 2, the method 200 may include S210 and S220. Optionally, the method 200 may further include one or more steps of S230 to S280. The following describes the steps.

S210: A core network device or an OAM sends first configuration information and first event information to a first network device.

The first configuration information includes configuration information for QOE measurement, and the configuration information for QOE measurement is used by a terminal device to perform QOE measurement. Optionally, the configuration information for QOE measurement may also be referred to as application layer measurement configuration information, or the configuration information for QOE measurement includes application layer measurement configuration information. For example, the configuration information for QOE measurement may include a QOE measurement metric (for example, for a download service (progressive download), the metric includes an average throughput, an initial usage delay (initial playout delay), a buffer level, and the like). For details, refer to 3GPP TS 26.247 and TS 26.114.

The first event information is used to indicate a first event. The first event is used by the first network device to determine whether to send the first configuration information to the terminal device.

For example, the first event may include one or both of the following.

(1) The first network device determines that quality that is of a signal sent by the first network device and that is obtained by the terminal device through measurement is lower than a first threshold.

For example, the first configuration information may include the first threshold. The terminal device may report, to the first network device, the quality that is of the signal sent by the first network device and that is obtained by the terminal device through measurement. The first network device may determine, by comparing the quality that is of the signal and that is reported by the terminal device with the first threshold, whether the quality of the signal is lower than the first threshold. Alternatively, the first network device configures a measurement event for the terminal device, where the measurement event is that when the quality that is of the signal sent by the first network device and that is obtained by the terminal device through measurement is lower than the first threshold, the terminal device reports, to the first network device, that a corresponding event has been triggered.

It should be understood that, if the quality that is of the signal sent by the first network device and that is obtained by the terminal device through measurement is lower than the first threshold, the first event is met.

(2) Quality that is of a signal sent by the terminal device and that is obtained by the first network device through measurement is lower than a second threshold.

The first configuration information may include the second threshold, or the second threshold may be configured in advance.

It should be understood that, if the quality of the signal sent by the terminal device is lower than the second threshold, the first event is met.

Signal quality may be measured by using a reference signal received power (RSRP), reference signal received quality (RSRQ), a packet loss rate or a bit error rate of uplink data transmission, a packet loss rate or a bit error rate of downlink data transmission, or another appropriate parameter. This is not limited in this application.

Optionally, in S210, in addition to sending the first configuration information and the first event information, the core network device or the OAM may further send the first network device parameters such as an area range of QOE measurement and a service type of QOE measurement.

It should be noted that, in this step, the first network device receives the first configuration information and the first event information from the core network device or the OAM. In this embodiment of the present invention, the method may be further applied to a scenario in which the first network device receives the first configuration information and the first event information from another device. For example, in a handover scenario, a source network device may send the first configuration information and the first event information that are received from the core network device to a target network device, and the target network device performs step S220.

S220: The first network device determines whether the first event is met.

If a determining result is yes, the first network device may perform S230; otherwise, the first network device does not perform S230 and subsequent operations.

S230: The first network device sends the first configuration information to the terminal device.

Specifically, after receiving the first event information and the first configuration information, the first network device determines whether the first event is met. If the first event is met, the first network device sends the first configuration information to the terminal device. If the first event is not met, the first network device does not send the first configuration information to the terminal device.

It should be understood that, if the core network device or the OAM further sends parameters other than the first event information and the first configuration information in S210, the first network device may further configure the first configuration information for the terminal device with reference to the parameters. For example, if the core network device or the OAM further sends the area range of QOE measurement to the first network device, the first network device may determine, with reference to the area range and the first event, terminal devices to which the first configuration information needs to be sent. It should be understood that, the terminal devices determined by the first network device include the foregoing terminal device.

Optionally, the first configuration information and the first event information may be periodically sent. The first network device may periodically perform S220, and a periodicity of performing S220 may be less than a configuration periodicity of the first configuration information and the first event information. If the first network device determines, this time, that the first event is not met, but determines, next time, that the first event is met, the first network device sends the first configuration information to the terminal device.

Optionally, the first network device may perform S220 for a plurality of times, for example, periodically perform S220 according to a rule set by the first network device. If the first network device determines, this time, that the first event is not met, but determines, next time, that the first event is met, the first network device sends the first configuration information to the terminal device.

When QOE measurement collection is performed, a network device needs to configure the configuration information for QOE measurement for the terminal device. However, if the network device directly sends the received configuration information for QOE measurement to the terminal device, overheads of air interface signaling are relatively large. The QOE measurement collection aims to improve service experience of a user. Usually, the service experience is greatly affected when signal quality is relatively poor, and the service experience is slightly affected when the signal quality is relatively good. Therefore, compared with relatively large overheads of air interface signaling caused by directly configuring the configuration information for QOE measurement, it may be considered that QOE measurement collocation is performed only when the signal quality is relatively poor, and QOE measurement collection is not performed when the signal quality is relatively good. According to the method provided in this application, after obtaining the configuration information for QOE measurement, the network device does not directly send the configuration information for QOE measurement to the terminal device, but may send the configuration information for QOE measurement to the terminal device when quality that is of a signal sent by the terminal device and that is obtained by the network device through measurement is lower than a specific threshold or quality of a signal received by the terminal device is lower than a specific threshold. In this way, unnecessary measurement configuration can be avoided, and overheads of air interface signaling can be reduced.

In this application, the first configuration information may be the same as or different from configuration information for QOE measurement in the conventional technology. The following describes operations after S230 with reference to content included in the first configuration information.

(1) The first configuration information includes only the configuration information for QOE measurement.

In this case, the terminal device performs QOE measurement and reports a measurement result with reference to the conventional technology.

(2) The first configuration information is further used to indicate a second event.

The second event is that quality that is of a signal sent by a network device and that is obtained by the terminal device through measurement is lower than a third threshold. It should be understood that, the network device herein may or may not be the foregoing first network device. This is not limited in this application.

In this case, after S230, the method may further include the following steps.

S240: The terminal device determines whether the second event is met.

In a possibility, if a determining result is yes, the terminal device performs S250; otherwise, the terminal device does not perform S250 and subsequent operations. After S250, the terminal device may perform S260 and subsequent operations.

In another possibility, if a determining result is yes, the terminal device performs S260; otherwise, the terminal device does not perform S260 and subsequent operations.

S250: An RRC layer of the terminal device sends the configuration information for QOE measurement to an upper layer of the RRC layer.

Specifically, after receiving the first configuration information, the terminal device determines whether the second event is met. If the second event is met, the terminal device sends the configuration information for QOE measurement to the upper layer. If the second event is not met, the terminal device does not send the configuration information for QOE measurement to the upper layer. That is, when the second event is not met, the terminal device cannot perform QOE measurement.

S260: The terminal device performs QOE measurement based on the configuration information for QOE measurement, to obtain a measurement result.

It should be understood that, QOE measurement is performed by the upper layer of the RRC layer herein, and the configuration information for QOE measurement is sent by the RRC layer of the terminal device to the upper layer of the RRC layer.

It should be further understood that, a method for performing QOE measurement is basically the same as that in the conventional technology, and details are not described herein.

After obtaining the measurement result in S260, the terminal device may report the measurement result according to the conventional technology. Alternatively, when the first configuration information is further used to indicate a third event, the terminal device may further perform the following S270 and a subsequent operation.

In this application, when signal quality is relatively good, impact on service experience is relatively small. Therefore, only when the signal quality is relatively poor, the upper layer of the RRC layer needs to perform QOE measurement. According to the method provided in this application, the upper layer of the RRC layer may perform QOE measurement only when the signal quality is relatively poor. In this way, unnecessary QOE measurement can be avoided, and further, reporting of QOE measurement results can be correspondingly reduced, so as to reduce signaling overheads.

(3) The first configuration information is further used to indicate a third event.

The third event is that quality that is of a signal sent by a network device and that is obtained by the terminal device through measurement is lower than a fourth threshold. It should be understood that, the network device herein may or may not be the foregoing first network device. This is not limited in this application.

In this case, the method may further include the following steps.

S270: The terminal device determines whether the third event is met.

If the third event is met, the terminal device may perform S280; otherwise, the terminal device does not perform S280.

S280: The terminal device reports the measurement result to a second network device.

Specifically, the terminal device may report the measurement result by using a first SRB set up between the terminal device and the second network device, so that the second network device can obtain the measurement result.

According to the method provided in this application, when signal quality is relatively good, impact on service experience is relatively small. Therefore, the terminal device may not report the measurement result when the signal quality is relatively good, but may report the measurement result only when the signal quality is relatively poor, so that signaling overheads can be reduced.

In addition, in the method, there are two optional manners about an occasion for setting up the first SRB.

In an implementation, the terminal device may set up the first SRB between the terminal device and the second network device in advance. For example, when sending the configuration information for QOE measurement to the terminal device, the first network device delivers configuration information of the first SRB.

In another implementation, after obtaining the measurement result, the terminal device may set up the first SRB based on configuration of the second network device. Specifically, this process may include the following steps.

S272: The terminal device sends indication information to the second network device.

The indication information is used to indicate that the terminal device has the measurement result. To be specific, the terminal device has obtained the measurement result, and notifies, by using the indication information, the second network device that the measurement result has been obtained.

S274: The second network device sends the configuration information of the first SRB to the terminal device.

After receiving the indication information, the second network device may learn that the terminal device already has the measurement result. In this case, the second network device sends the configuration information of the first SRB to the terminal device, and indicates the terminal device to set up the first SRB.

S276: The terminal device sets up the first SRB based on the configuration information of the first SRB.

After setting up the first SRB, the terminal device may send the measurement result by using the first SRB.

Optionally, in addition to sending the measurement result, the terminal device may further send signal quality that is of a current serving cell and that is obtained by the terminal device through measurement. Further, the terminal device may send signal quality that is of another neighboring cell and that is obtained by the terminal device through measurement.

In this implementation, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

It should be understood that, the first configuration information may indicate only one of the second event and the third event, or may indicate both the second event and the third event. In a case in which the first configuration information does not indicate the second event, after S230, S250 and subsequent operations may be directly performed without performing S240.

It should be further understood that, the first network device and the second network device may be a same network device, or may be different network devices.

Figure 3:
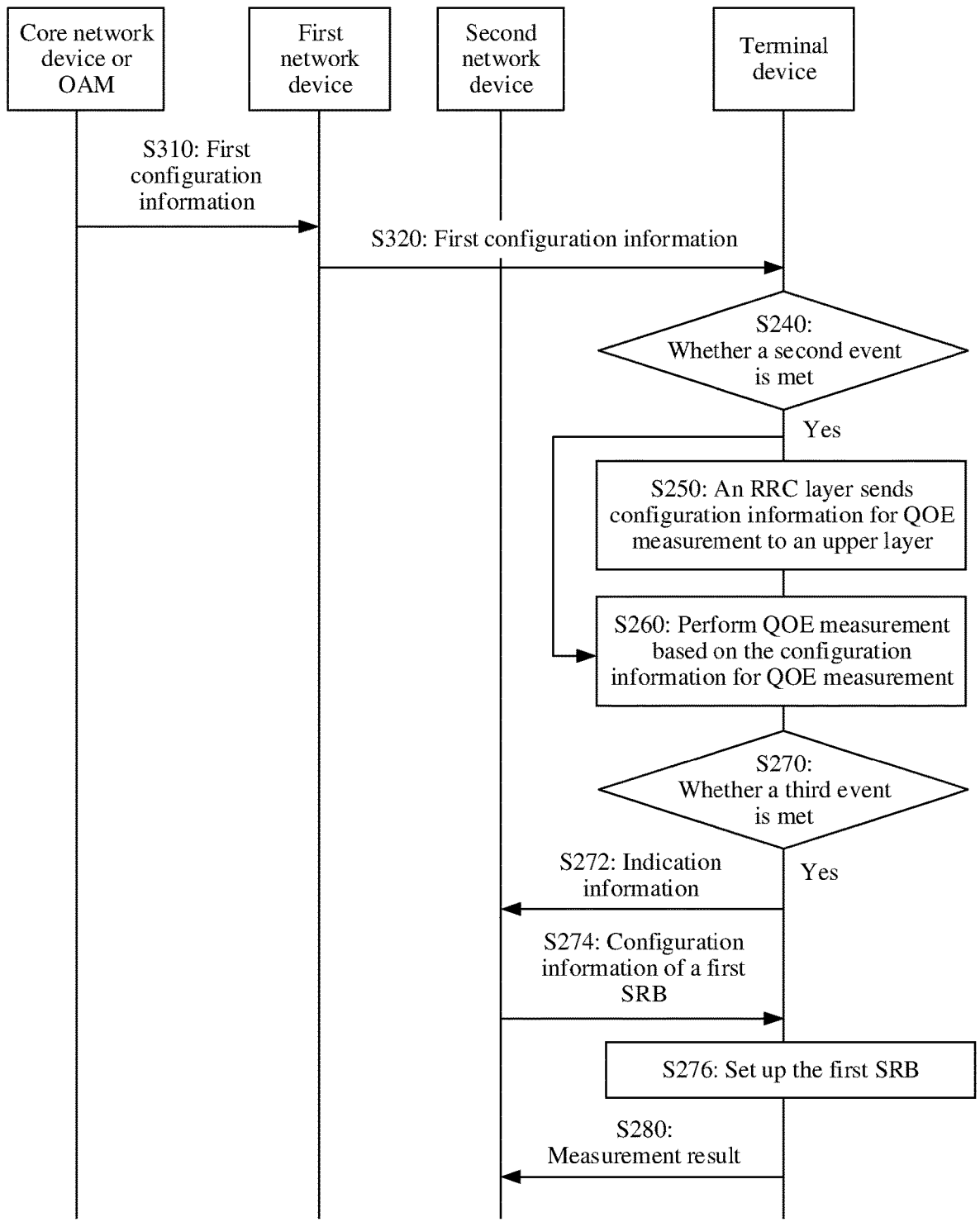
FIG. 3 is a schematic flowchart of another method for QOE measurement according to this application.

FIG. 3 is a schematic flowchart of another method for QOE measurement according to this application. A difference between the method 300 and the method 200 lies in that, in the method 300, a first network device does not need to determine whether a first event is met, but directly sends received first configuration information to a terminal device.

As shown in FIG. 3, the method 300 may include S310 to S320, and may include one or more steps of S230 to S280. The following describes the steps.

S310: A core network device or an OAM sends the first configuration information to the first network device.

The first configuration information includes configuration information for QOE measurement. For content included in the configuration information for QOE measurement, refer to the foregoing description.

Optionally, in S310, the core network device or the OAM may further send the first network device parameters such as an area range of QOE measurement and a service type of QOE measurement.

It should be noted that, in this step, the first network device receives the first configuration information from the core network device or the OAM. In this embodiment of the present invention, the method may be further applied to a scenario in which the first network device receives the first configuration information from another device. For example, in a handover scenario, a source network device may send the first configuration information received from the core network device to a target network device, and the target network device performs step S320.

S320: The first network device sends the first configuration information to the terminal device.

The first configuration information is further used to indicate one of the second event and the third event, or may indicate both the second event and the third event.

Based on different events indicated by the first configuration information, after S320, the method may further include one or more steps of S240 to S280 shown in FIG. 2 from top to bottom. For details, refer to the foregoing description. Details are not described herein again.

It should be understood that, if the core network device or the OAM further sends parameters other than the first configuration information in S310, the first network device may further configure the first configuration information for the terminal device with reference to the parameters in S320. For example, if the core network device or the OAM further sends the area range of QOE measurement to the first network device, the first network device may determine, based on the area range, terminal devices to which the first configuration information needs to be sent. It should be understood that, the terminal devices determined by the first network device include the foregoing terminal device.

According to the method provided in this application, when signal quality is relatively good, impact on service experience is relatively small. Therefore, in a manner, the terminal device may not perform QOE measurement when the signal quality is relatively good, but may perform QOE measurement only when the signal quality is relatively poor, so that signaling overheads can be reduced. In another manner, the terminal device may not report a measurement result when the signal quality is relatively good, but may report the measurement result only when the signal quality is relatively poor, so that signaling overheads can be reduced.

Figure 4:
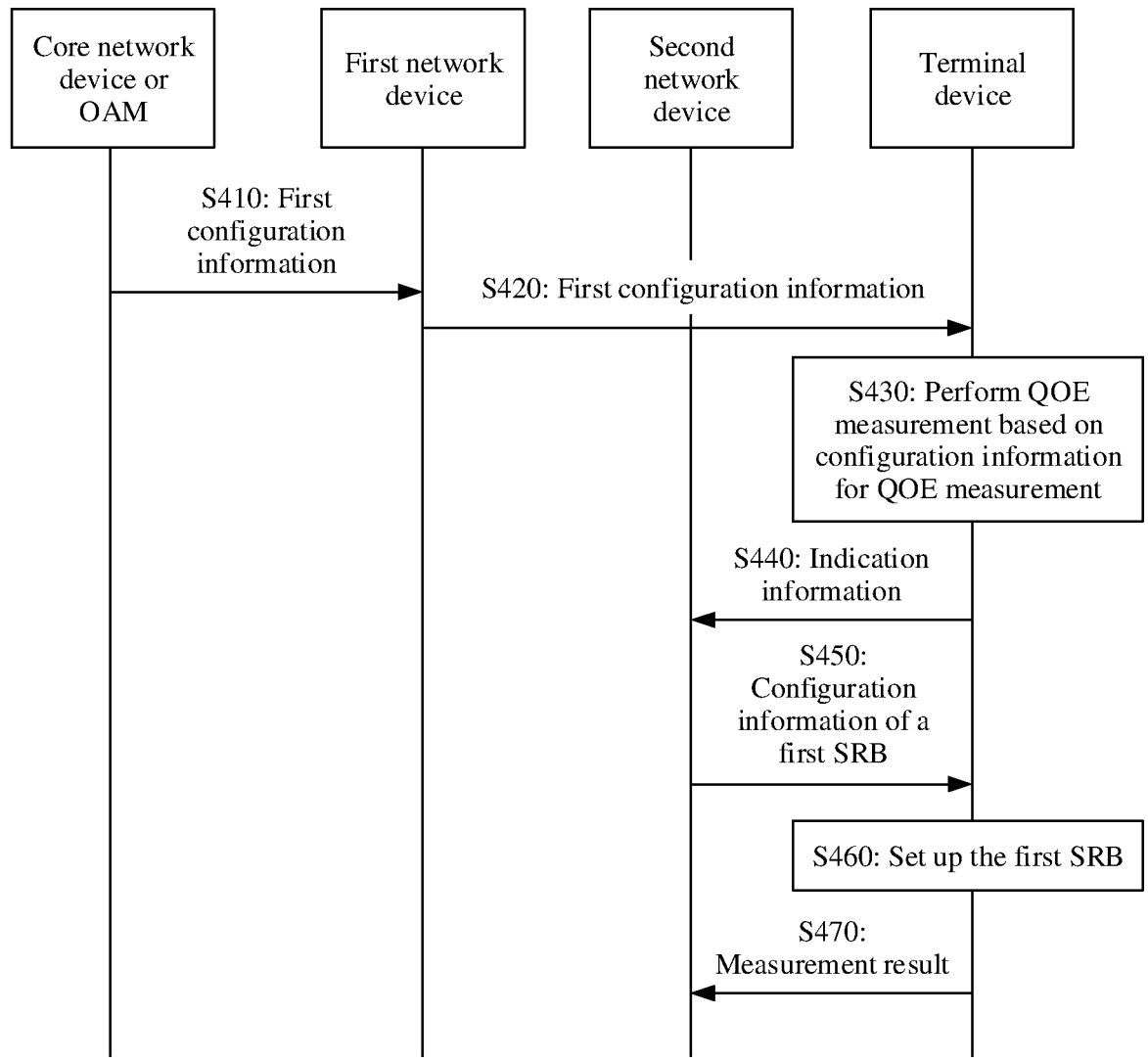
FIG. 4 is a schematic flowchart of a method for QOE measurement according to this application.

FIG. 4 is a schematic flowchart of another method for QOE measurement according to this application. As shown in FIG. 4, the method 400 may include S410 to S470.

S410: A core network device or an OAM sends first configuration information to a first network device.

The first configuration information includes configuration information for QOE measurement. For content included in the configuration information for QOE measurement, refer to the foregoing description.

Optionally, in S410, the core network device or the OAM may further send the first network device parameters such as an area range of QOE measurement and a service type of QOE measurement.

It should be noted that, in this step, the first network device receives the first configuration information from the core network device or the OAM. In this embodiment of the present invention, the method may be further applied to a scenario in which the first network device receives the first configuration information from another device. For example, in a handover scenario, a source network device may send the first configuration information received from the core network device to a target network device, and the target network device performs step S420.

S420: The first network device sends the first configuration information to a terminal device.

It should be understood that, if the core network device or the OAM further sends parameters other than the first configuration information in S410, the first network device may further configure the first configuration information for the terminal device with reference to the parameters in S420. For example, if the core network device or the OAM further sends the area range of QOE measurement to the first network device, the first network device may determine, based on the area range, terminal devices to which the first configuration information needs to be sent. It should be understood that, the terminal devices determined by the first network device include the foregoing terminal device.

S430: The terminal device performs QOE measurement based on the configuration information for QOE measurement in the first configuration information, to obtain a measurement result.

S440 to S460: The terminal device sends indication information to a second network device, the first network device sends configuration information of a first SRB to the terminal device based on the indication information, and the terminal device sets up the first SRB based on the configuration information of the first SRB.

It should be understood that, for S440 to S460, refer to the foregoing descriptions of S272 to S276. Details are not described herein again.

S470: The terminal device reports the measurement result to the second network device.

Optionally, in addition to sending the measurement result, the terminal device may further send signal quality that is of a current serving cell and that is obtained by the terminal device through measurement. Further, the terminal device may send signal quality that is of another neighboring cell and that is obtained by the terminal device through measurement.

According to the method provided in this application, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

Figure 5:
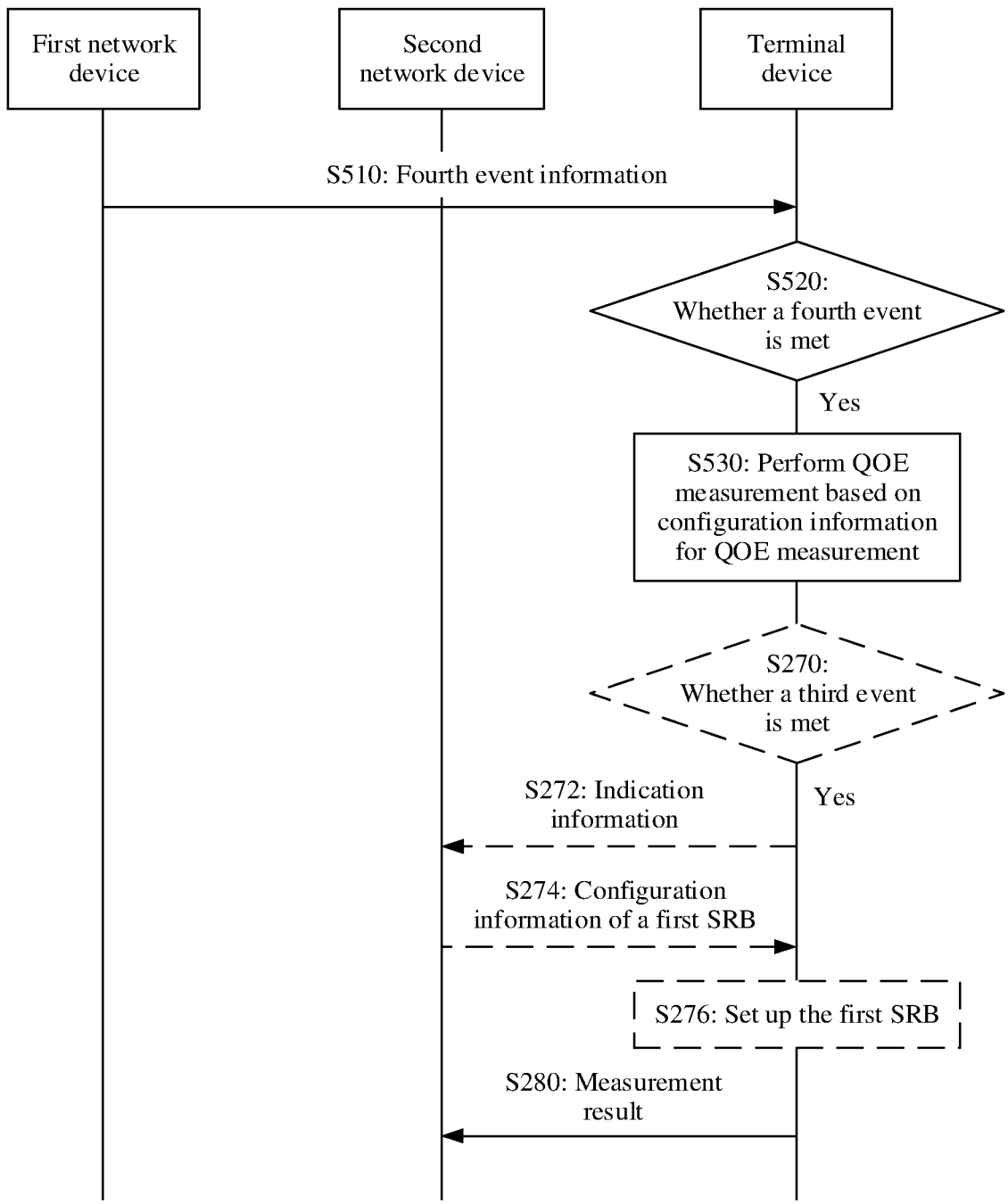
FIG. 5 is a schematic flowchart of another method for QOE measurement according to this application.

FIG. 5 is a schematic flowchart of another method for QOE measurement according to this application. As shown in FIG. 5, the method 500 may include S510 to S530. Optionally, the method 500 may further include one or more steps after S260 shown in FIG. 2. The following describes the steps.

S510: A first network device sends fourth event information to a terminal device.

The fourth event information is used to indicate a fourth event. The fourth event is used by the terminal device to determine whether to perform QOE measurement based on configuration information for QOE measurement. Herein, the configuration information for QOE measurement may be preconfigured by a network device for the terminal device, or may be sent by a network device to the terminal device, or may be configured by default (for example, specified in a protocol). This is not limited in this application. It should be understood that, the network device herein may or may not be the first network device. For example, the fourth event may be that quality that is of a signal sent by the network device and that is obtained by the terminal device through measurement is lower than a fifth threshold. Alternatively, the fourth event may be that an upper layer (for example, an application layer) of an RRC layer of the terminal device detects that some service performance indicators are higher than a threshold (for example, buffering time of a service is higher than a sixth threshold, or a packet loss rate of a service is higher than a seventh threshold). It should be understood that, the network device herein may or may not be the first network device.

Optionally, the fourth event information may be sent by using a broadcast message, or may be sent by using an RRC message or other signaling. This is not limited in this application.

It should be noted that, step S501 is optional, in other words, the fourth event information may be configured by default (for example, specified in the protocol).

S520: The terminal device determines whether the fourth event is met.

If the fourth event is met, S530 is performed; otherwise, S530 and a subsequent operation are not performed.

S530: The terminal device performs QOE measurement based on the configuration information for QOE measurement, to obtain a result.

Specifically, the terminal device may determine whether the fourth event is met. If the fourth event is met, the terminal device is triggered to perform QOE measurement; or if the fourth event is not met, the terminal device does not perform QOE measurement.

Optionally, the terminal device may perform S520 for a plurality of times according to a specific rule (for example, periodically). If the terminal device determines, this time, that the fourth event is met, S530 is performed; otherwise, S530 is not performed.

After performing QOE measurement to obtain a measurement result, the terminal device may report the measurement result according to the conventional technology, or may report the measurement result with reference to subsequent operations of S260 shown in FIG. 2.

It should be noted that, in the method, a third event may be indicated by using signaling that carries the fourth event information, or may be indicated by using other signaling or another message. This is not limited in this application.

According to the method provided in this application, the terminal device may perform QOE measurement only when the fourth event is met, and may not perform QOE measurement when the fourth event is not met. In this way, unnecessary QOE measurement can be avoided, reporting of measurement results can be correspondingly reduced, and signaling overheads can be reduced.

Figure 6:
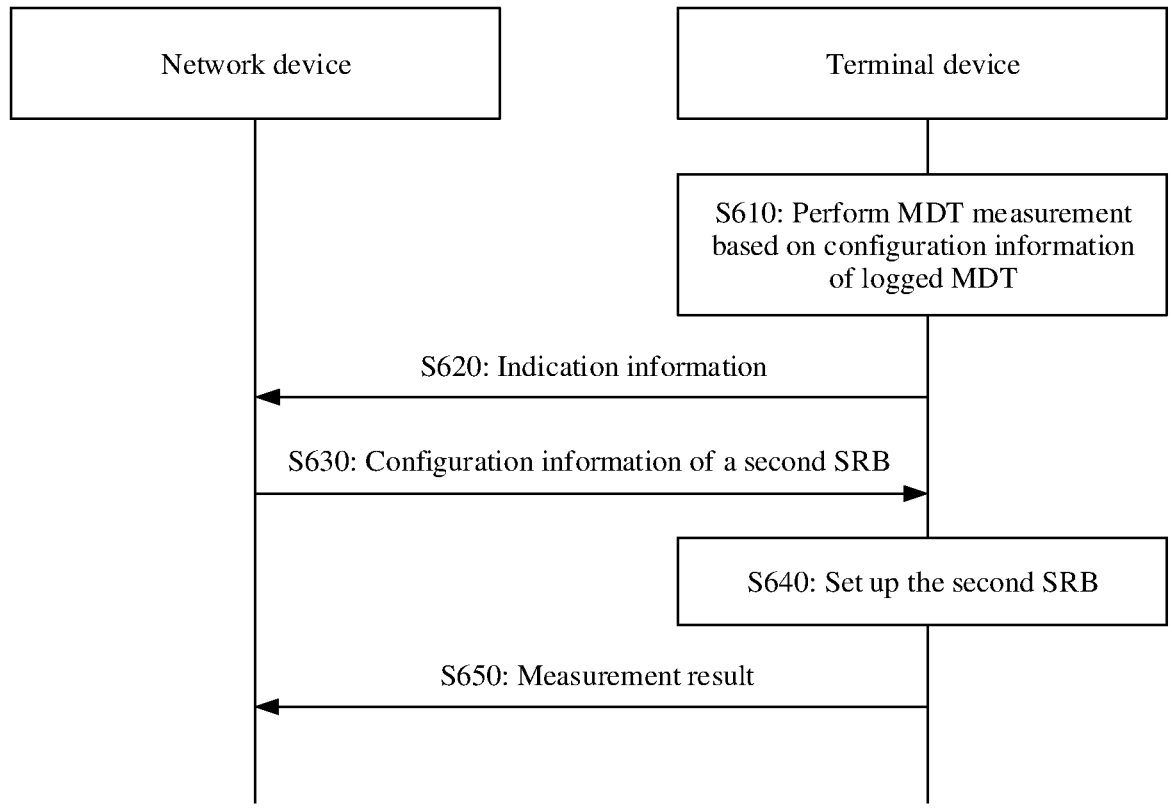
FIG. 6 is a schematic flowchart of a method for measurement reporting according to this application.

FIG. 6 is a schematic flowchart of another method for measurement reporting according to this application. As shown in FIG. 6, the method 600 may include S610 to S650. The following describes the steps.

S610: A terminal device performs MDT measurement based on configuration information of logged MDT, to obtain a measurement result.

It should be understood that, the configuration information of the logged MDT may be configured according to the conventional technology before S610. For specific configuration and content included in the configuration information of the MDT, refer to the conventional technology. Details are not described herein. It should be further understood that, for how the terminal device specifically performs MDT measurement based on the configuration information of the logged MDT, refer to the conventional technology.

It should be noted that, in this embodiment, measurement of logged MDT is used as an example for description, and this embodiment may be further applied to other measurement, to be specific, may be applied to a case in which the terminal device may obtain, by using another technology, one piece of measurement result information, for example, random access channel (RACH) information, radio link failure (RLF) information, or radio connection setup failure information logged by a terminal device in the conventional technology.

S620: The terminal device sends indication information to a network device. The indication information is used to indicate that the terminal device has the measurement result.

S630: The network device sends configuration information of a second SRB to the terminal device.

S640: The terminal device sets up the second SRB based on the configuration information of the second SRB.

Specifically, after obtaining the measurement result, the terminal device may send the indication information to the network device, and indicate, by using the indication information, that the terminal device has the measurement result. After learning that the terminal device has the measurement result, if the network device determines to enable the terminal device to report the measurement result, the network device sends the configuration information of the second SRB to the terminal device, and the terminal device may set up the second SRB based on the configuration information of the second SRB.

S650: The terminal device sends the measurement result to the network device by using the second SRB.

According to the method provided in this application, before the terminal device reports the measurement result, the network device does not need to configure, for the terminal device, configuration information of an SRB for transmitting the measurement result, but the network device configures, for the terminal device, the configuration information of the SRB for transmitting the measurement result only when the terminal device has the measurement result. In this way, an objective of configuring the configuration information of the SRB based on a requirement can be implemented, so that signaling overheads can be reduced, and a processing load of the terminal device can be reduced.

It should be understood that the solutions in the embodiments of this application may be properly combined for use, and explanations or descriptions of terms in the embodiments may be cross-referenced or explained in the embodiments. This is not limited.

It should be further understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of the embodiments of this application.

The foregoing describes in detail methods provided in the embodiments of this application with reference to FIG. 2 to FIG. 6. The following describes in detail apparatuses provided in embodiments of this application with reference to FIG. 7 to FIG. 9.

Figure 7:
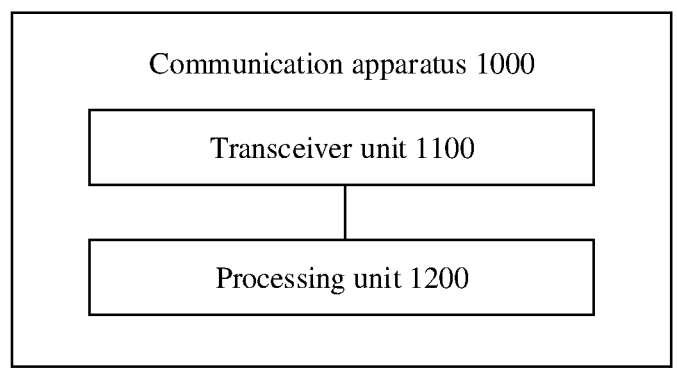
FIG. 7 is a schematic block diagram of a communication apparatus according to this application.

FIG. 7 is a schematic block diagram of a communication apparatus according to an embodiment of this application. As shown in FIG. 7, the communication apparatus 1000 may include a transceiver unit 1100 and a processing unit 1200.

The transceiver unit 1100 may be configured to receive information sent by another apparatus, and may be further configured to send information to another apparatus. For example, the transceiver unit 1100 is configured to send first configuration information or receive the first configuration information. The processing unit 1200 may be configured to perform content processing of the apparatus, for example, determine whether a first event is met and determine whether a second event is met.

In a possible design, the communication apparatus 1000 may correspond to the terminal device in the foregoing method embodiments.

Specifically, the communication apparatus 1000 may correspond to the terminal device in any one of the methods 200 to 600 according to the embodiments of this application, and the communication apparatus 1000 may include a unit configured to perform an operation performed by the terminal device in a corresponding method. In addition, units in the communication apparatus 1000 are separately configured to implement operations performed by the terminal device in corresponding methods.

For example, when the communication apparatus 1000 corresponds to the terminal device in the method 200, the transceiver unit 1100 is configured to receive first configuration information sent by a first network device, where the first configuration information includes configuration information for QOE measurement, the first configuration information is further used to indicate a second event, and the second event is that quality that is of a signal sent by a network device and that is obtained by the processing unit through measurement is lower than a third threshold. The processing unit 1200 is configured to: when determining that the second event is met, send the configuration information for QOE measurement to an upper layer of a radio resource control RRC layer by using the RRC layer of the apparatus, and perform, at the upper layer of the RRC layer, QOE measurement based on the configuration information for QOE measurement, to obtain a measurement result.

For example, when the communication apparatus 1000 corresponds to the terminal device in the method 300, the transceiver unit 1100 is configured to receive first configuration information sent by a first network device, where the first configuration information includes configuration information for QOE measurement, the first configuration information is further used to indicate a second event, and the second event is that quality that is of a signal sent by the network device and that is obtained by the processing unit through measurement is lower than a third threshold. The processing unit 1200 is configured to: when determining that the second event is met, perform QOE measurement based on the configuration information for QOE measurement, to obtain a measurement result.

For example, when the communication apparatus 1000 corresponds to the terminal device in the method 600, the transceiver unit 1100 is configured to: send indication information, where the indication information is used to indicate that the terminal device has a measurement result, and the measurement result is obtained by the terminal device by performing MDT measurement based on configuration information for logged minimization of drive-tests (MDT) technology measurement; and receive configuration information that is of a second SRB and that is sent by a network device. The processing unit 1200 is configured to: set up the second SRB based on the configuration information of the second SRB, and receive the configuration information that is of the second SRB and that is sent by the transceiver unit. The transceiver unit 1100 is further configured to send the measurement result by using the second SRB.

In another possible design, the communication apparatus 1000 may correspond to the first network device in the foregoing method embodiments, for example, may be a first network device or a chip configured in the first network device.

Specifically, the communication apparatus 1000 may correspond to the first network device in any one of the methods 200 to 500 according to the embodiments of this application, and the communication apparatus 1000 may include a unit configured to perform an operation performed by the first network device in a corresponding method. In addition, units in the communication apparatus 1000 are separately configured to implement operations performed by the first network device in corresponding methods.

For example, when the communication apparatus 1000 corresponds to the first network device in the method 200, the transceiver unit 1100 is configured to: receive first configuration information and first event information, where the first configuration information includes configuration information for QOE measurement, and the first event information is used to indicate a first event; and when the processing unit 1200 determines that the first event is met, send the first configuration information to a terminal device, where the first event includes one or both of the following: the processing unit determines that quality that is of a signal sent by the apparatus and that is obtained by the terminal device through measurement is lower than a first threshold, and quality that is of a signal sent by the terminal device and that is obtained by the processing unit through measurement is lower than a second threshold.

For example, when the communication apparatus 1000 corresponds to the first network device in the method 300, the transceiver unit 1100 is configured to: receive first configuration information, and send the first configuration information to a terminal device. The first configuration information includes configuration information for QOE measurement, and the first configuration information is further used to indicate one or both of a second event and a third event; the first configuration information is used to indicate a radio resource control RRC layer of the terminal device to determine, based on the second event, whether to send the configuration information for QOE measurement to an upper layer of the RRC layer, or the first configuration information is used to indicate the terminal device to determine, based on the second event, whether to perform QOE measurement based on the configuration information for QOE measurement; the first configuration information is used to indicate the terminal device to determine, based on the third event, whether to report a measurement result, and the measurement result is obtained by performing QOE measurement based on the configuration information for QOE measurement; and the second event is that quality that is of a signal sent by a network device and that is obtained by the terminal device through measurement is lower than a third threshold, and the third event is that the quality that is of the signal sent by the network device and that is obtained by the terminal device through measurement is lower than a fourth threshold.

In a possible design, the communication apparatus 1000 may correspond to the second network device in the foregoing method embodiments, for example, may be a second network device or a chip configured in the second network device.

Specifically, the communication apparatus 1000 may correspond to the second network device in any one of the methods 200 to 500 according to the embodiments of this application, and the communication apparatus 1000 may include a unit configured to perform an operation performed by the second network device in a corresponding method. In addition, units in the communication apparatus 1000 are separately configured to implement operations performed by the second network device in corresponding methods.

For example, the transceiver unit 1100 may be configured to: receive indication information sent by a terminal device, where the indication information is used to indicate that the terminal device has a measurement result, and the measurement result is obtained by the terminal device by performing QOE measurement based on configuration information for QOE measurement; send configuration information of a first SRB to the terminal device; and receive the measurement result sent by the terminal device by using the first SRB.

In a possible design, the communication apparatus 1000 may correspond to the network device in the foregoing method embodiments, for example, may be a network device or a chip configured in the network device.

Specifically, the communication apparatus 1000 may correspond to the network device in the method 600 according to the embodiments of this application, and the communication apparatus 1000 may include a unit configured to perform an operation performed by the network device in the method. In addition, units in the communication apparatus 1000 are separately configured to implement operations performed by the network device in the method.

For example, the transceiver unit 1100 may be configured to: receive indication information sent by a terminal device, where the indication information is used to indicate that the terminal device has a measurement result, and the measurement result is obtained by the terminal device by performing MDT measurement based on configuration information for logged MDT measurement; and send configuration information of a second SRB to the terminal device, where the second SRB is used to send the measurement result.

It should be understood that a specific process in which the units perform the foregoing corresponding steps is described in detail in the foregoing method embodiments, and for brevity, details are not described herein.

Figure 8:
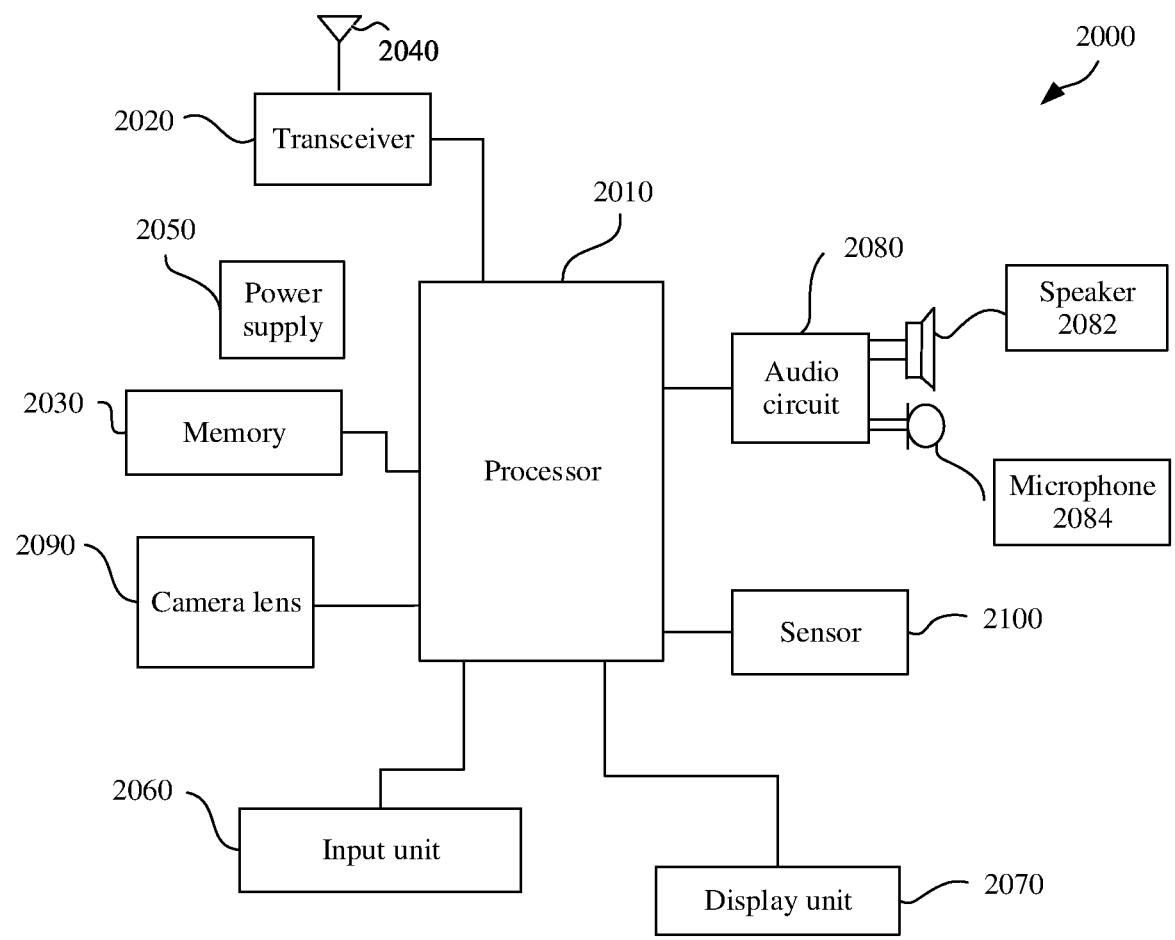
FIG. 8 is a schematic diagram of a structure of a terminal device according to this application.

It should be further understood that when the communication apparatus 1000 is the terminal device, the transceiver unit 1100 in the communication apparatus 1000 may correspond to a transceiver 2020 in a terminal device 2000 shown in FIG. 8, and the processing unit 1200 in the communication apparatus 1000 may correspond to a processor 2010 in the terminal device 2000 shown in FIG. 8.

It should be further understood that, when the communication apparatus 1000 is the chip disposed in the terminal device, the transceiver unit 1200 in the communication apparatus 1000 may be an input/output interface.

Figure 9:
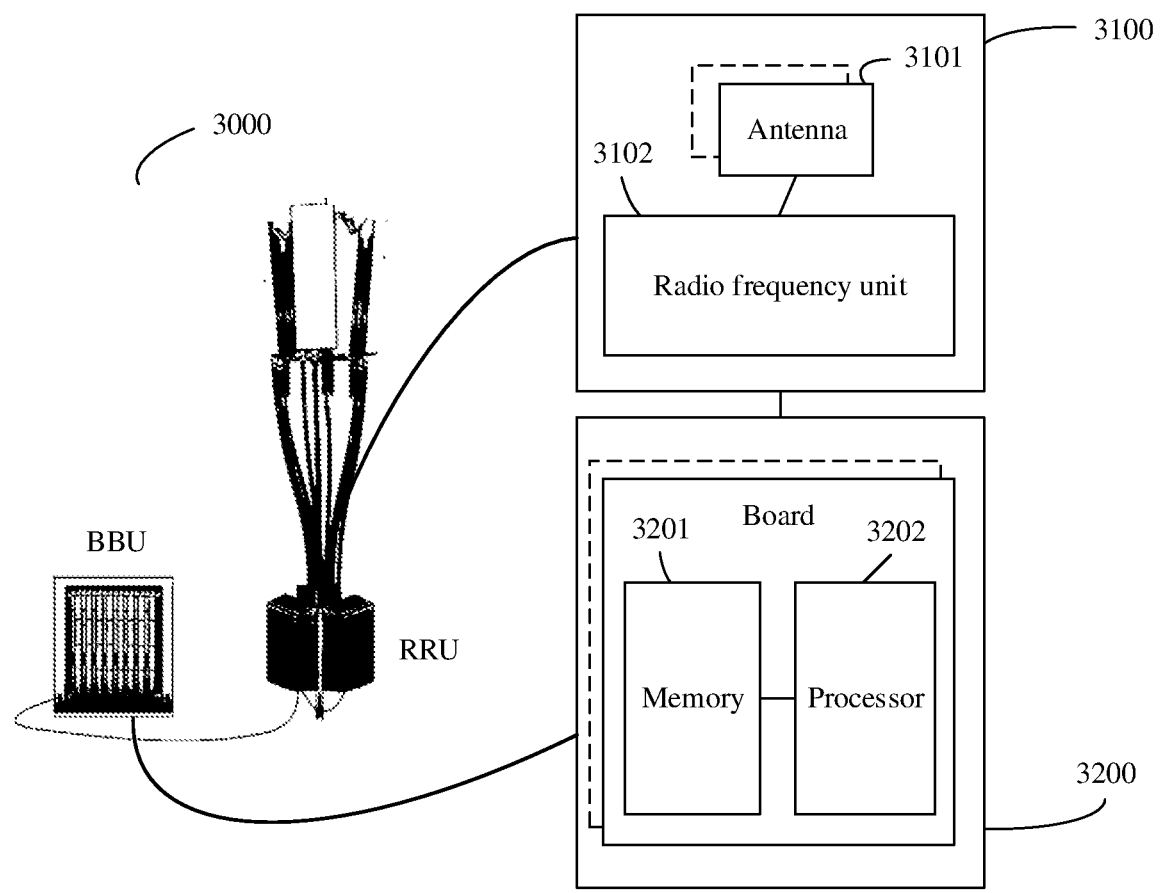
FIG. 9 is a schematic diagram of a structure of a network device according to this application.

It should be further understood that, when the communication apparatus 1000 is the network device, the first network device, or the second network device, the transceiver unit 1100 in the communication apparatus 1000 may correspond to a transceiver 3200 in a network device 3000 shown in FIG. 9, and the processing unit 1200 in the communication apparatus 1000 may correspond to a processor 3100 in the network device 3000 shown in FIG. 9.

It should be further understood that, when the communication apparatus 1000 is the chip disposed in the network device, the transceiver unit 1100 in the communication apparatus 1000 may be an input/output interface.

FIG. 8 is a schematic diagram of a structure of a terminal device 2000 according to an embodiment of this application. The terminal device 2000 may be used in the system shown in FIG. 1, to perform a function of the terminal device in the foregoing method embodiments. As shown in FIG. 8, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke and run the computer program in the memory 2030, to control the transceiver 2020 to receive or send a signal. Optionally, the terminal device 2000 may further include an antenna 2040, configured to send, through a radio signal, uplink data or uplink control signaling that is output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 7.

The transceiver 2020 may correspond to the communication unit in FIG. 7, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 8 can implement processes related to the terminal device in any method embodiment in the method embodiments shown in FIG. 2 to FIG. 6. Operations or functions of modules in the terminal device 2000 are respectively intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of sending to a network device or receiving from a network device that is performed by the terminal device and that is described in the foregoing method embodiments. For details, refer to the descriptions in the foregoing method embodiments. Details are not described herein again.

Optionally, the terminal device 2000 may further include a power supply 2050, configured to supply power to components or circuits in the terminal device.

In addition, to make functions of the terminal device more perfect, the terminal device 2000 may further include one or more of an input unit 2060, a display unit 2070, an audio circuit 2080, a camera lens 2090, a sensor 2100, and the like, and the audio circuit may further include a speaker 2082, a microphone 2084, and the like.

FIG. 9 is a schematic diagram of a structure of a network device according to an embodiment of this application, for example, may be a schematic diagram of a structure of a base station. The base station 3000 may be used in the system shown in FIG. 1, to perform a function of the network device in the foregoing method embodiments. As shown in the figure, the base station 3000 may include one or more radio frequency units, for example, a remote radio unit (RRU) 3100 and one or more baseband units (BBUs) (which may also be referred to as distributed units (DUs)) 3200. The RRU 3100 may be referred to as a transceiver unit or a communication unit, and corresponds to the transceiver unit 1100 in FIG. 7. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 3100 is mainly configured to receive and send radio frequency signals and perform conversion between a radio frequency signal and a baseband signal. The BBU 3200 is mainly configured to: perform baseband processing, control the base station, and the like. The RRU 3100 and the BBU 3200 may be physically disposed together, or may be physically disposed separately, namely, a distributed base station.

The BBU 3200 is a control center of the base station, and may be referred to as a processing unit, may correspond to the processing unit 1200 in FIG. 7, and is mainly configured to implement a baseband processing function, for example, channel encoding, multiplexing, modulation, or frequency spread. For example, the BBU (the processing unit) may be configured to control the base station to perform an operation procedure related to the network device in the foregoing method embodiments.

In an example, the BBU 3200 may include one or more boards, and a plurality of boards may jointly support a radio access network (such as an LTE network) having a single access standard, or may respectively support radio access networks (such as an LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, is configured to control the base station to execute an operation procedure related to the network device, the first network device, or the second network device in the foregoing method embodiments. The memory 3201 and the processor 3202 may serve one or more boards. In other words, the memory and processor can be separately set on each board. Alternatively, a plurality of boards may share a same memory and a same processor. In addition, a necessary circuit may be further disposed on each board.

It should be understood that, the base station 3000 shown in FIG. 9 can implement processes related to the network device, the first network device, or the second network device in the foregoing method embodiments. Operations or functions of modules in the base station 3000 are respectively intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device, the first network device, or the second network device and that is described in the foregoing method embodiments, and the RRU 3100 may be configured to perform an action of sending to the terminal device or receiving from the terminal device that is performed by the network device, the first network device, or the second network device and that is described in the foregoing method embodiments. For details, refer to the descriptions in the foregoing method embodiments. Details are not described herein again.

According to the method provided in the embodiments of this application, this application further provides a computer program product. The computer program product includes computer program code. When the computer program code is run on a computer, the computer is enabled to perform the method on a terminal device side in any one of the foregoing method embodiments.

According to the method provided in the embodiments of this application, this application further provides a computer-readable medium. The computer-readable medium stores program code. When the program code is run on a computer, the computer is enabled to perform the method on a first network device side in the foregoing method embodiment.

According to the method provided in the embodiments of this application, this application further provides a computer-readable medium. The computer-readable medium stores program code. When the program code is run on a computer, the computer is enabled to perform the method on a second network device side in the foregoing method embodiment.

According to the method provided in the embodiments of this application, this application further provides a computer-readable medium. The computer-readable medium stores program code. When the program code is run on a computer, the computer is enabled to perform the method on a network device side in the foregoing method embodiment.

According to the method provided in the embodiments of this application, this application further provides a system, including the foregoing one or more terminal devices, and including at least one of one or more network devices, one or more first network devices, and one or more second network devices.

An embodiment of this application further provides a processing apparatus, including a processor and an interface. The processor is configured to perform the communication method in any one of the foregoing method embodiments.

It should be understood that, the processing apparatus may be a chip. For example, the processing apparatus may be a field programmable gate array (FPGA), or may be a general-purpose processor, a digital signal processor (DSP), an application-specific integrated circuit (ASIC), a field programmable gate array (FPGA) or another programmable logic device, a discrete gate or transistor logic device, a discrete hardware component, may be a system on chip (SoC), may be a central processing unit (CPU), may be a network processor (NP), may be a digital signal processor (DSP), may be a micro controller unit (MCU), and may be a programmable logic device (PLD) or another integrated chip. The methods, the steps, and logic block diagrams that are disclosed in the embodiments of this application may be implemented or performed. The general-purpose processor may be a microprocessor, or the processor may be any conventional processor or the like. The steps of the methods disclosed with reference to the embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that, in the embodiments of this application, the memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that memories in the system and method described in this specification include but are not limited to the memories and memories of any other proper types.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments exactly correspond to the network device and the terminal device in the method embodiments. A corresponding module or unit performs a corresponding step. For example, a communications unit (a transceiver) performs a receiving step or a sending step in the method embodiments, and a processing unit (a processor) may perform another step other than the sending step and the receiving step. For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that is run on a processor, the processor, an object, an executable file, a thread of execution, a program, or a computer. As illustrated by using the figures, both a computing device and an application that runs on the computing device may be components. One or more components may reside within a process or a thread of execution, and a component may be located on one computer or distributed between two or more computers. In addition, these components may be executed from various computer-readable media that store various data structures. For example, the components may communicate by using a local or remote process, for example, based on a signal having one or more data packets (for example, data from two components interacting with another component in a local system, a distributed system, or across a network such as the internet interacting with another system by using the signal).

It should be understood that "an embodiment" mentioned in the entire specification particular features, structures, or characteristics related to the embodiment are included in at least one embodiment of this application. Therefore, the embodiments in the entire specification are not necessarily same embodiments. In addition, the particular features, structures, or characteristics may be combined in one or more embodiments by using any appropriate manner.

It should be understood that, in the embodiments of this application, numbers "first", "second", and the like are merely used to distinguish between different objects, for example, to distinguish between different network devices, and do not constitute a limitation on the scope of the embodiments of this application. The embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that in the embodiments of this application, "B corresponding to A" indicates that B is associated with A, and B may be determined based on A. However, it should be further understood that determining B based on A does not mean that B is determined based on only A. B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in the embodiments of this application, the terminal device and/or the network device may perform some or all steps in the embodiments of this application. These steps or operations are merely examples.

In the embodiments of this application, other operations or variations of various operations may be further performed. In addition, the steps may be performed in a sequence different from a sequence presented in the embodiments of this application, and not all the operations in the embodiments of this application may be performed.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a network device, first configuration information and first event information, wherein the first configuration information comprises configuration information for quality of experience (QOE) measurement, and the first event information indicates a first event; and
when the first event is detected, sending, by the network device, the first configuration information to a terminal device, wherein the first event comprises one or both of the following: the network device determines that a quality that is of a signal sent by the network device and that is obtained by the terminal device through measurement is lower than a first threshold, or a quality that is of a signal sent by the terminal device and that is obtained by the network device through measurement is lower than a second threshold;
wherein the first configuration information indicates a second event;
wherein the first configuration information further indicates to a radio resource control (RRC) layer of the terminal device to determine, based on the second event, whether to send the configuration information for QOE measurement to an upper layer of the RRC layer; and
wherein the second event is that the quality that is of the signal sent by the network device and that is obtained by the terminal device through measurement is lower than a third threshold.

2. The method according to claim 1, wherein the first configuration information further indicates to the terminal device to determine, based on the second event, whether to perform QOE measurement based on the configuration information for QOE measurement.

3. The method according to claim 1, wherein the first configuration information further indicates a third event;
wherein the first configuration information further indicates to the terminal device to determine, based on the third event, whether to report a measurement result, and the measurement result is obtained by performing QOE measurement based on the configuration information for QOE measurement; and
wherein the third event is that the quality that is of the signal sent by the network device and that is obtained by the terminal device through measurement is lower than a fourth threshold.

4. The method according to claim 1, further comprising:
receiving, by the network device, indication information sent by the terminal device, wherein the indication information indicates that the terminal device has a measurement result to report, and the measurement result is obtained by the terminal device by performing QOE measurement based on the configuration information for QOE measurement; and
sending, by the network device, configuration information of a first signaling radio bearer (SRB) to the terminal device, wherein the first SRB is used to send the measurement result.

5. The method according to claim 4, further comprising:
receiving, by the network device, the measurement result reported by the terminal device using the first SRB.

6. The method according to claim 1, wherein the first event comprises that the network device determines that the quality that is of the signal sent by the network device and that is obtained by the terminal device through measurement is lower than the first threshold.

7. The method according to claim 1, wherein the first event comprises that the quality that is of the signal sent by the terminal device and that is obtained by the network device through measurement is lower than the second threshold.

8. The method according to claim 1, wherein the first event comprises that the network device determines that the quality that is of the signal sent by the network device and that is obtained by the terminal device through measurement is lower than the first threshold, or the quality that is of the signal sent by the terminal device and that is obtained by the network device through measurement is lower than the second threshold.

9. A communication apparatus, comprising:
a processor; and
a non-transitory memory coupled to the processor, the non-transitory memory comprising instructions that, when executed by the processor, cause the communication apparatus to:
receive first configuration information and first event information, wherein the first configuration information comprises configuration information for quality of experience (QOE) measurement, and the first event information indicates a first event; and
when the first event is detected, send the first configuration information to a terminal device, wherein the first event comprises one or both of the following: a quality that is of a signal sent by the communication apparatus and that is obtained by the terminal device through measurement is lower than a first threshold, or a quality that is of a signal sent by the terminal device and that is obtained by the communication apparatus through measurement is lower than a second threshold;
wherein the first configuration information indicates a second event;
wherein the first configuration information further indicates to a radio resource control (RRC) layer of the terminal device to determine, based on the second event, whether to send the configuration information for QOE measurement to an upper layer of the RRC layer, or the first configuration information further indicates to the terminal device to determine, based on the second event, whether to perform QOE measurement based on the configuration information for QOE measurement; and
wherein the second event is that a quality that is of the signal sent by the communication apparatus and that is obtained by the terminal device through measurement is lower than a third threshold.

10. The communication apparatus according to claim 9, wherein the first configuration information further indicates a third event;
wherein the first configuration information further indicates to the terminal device to determine, based on the third event, whether to report a measurement result, and the measurement result is obtained by performing QOE measurement based on the configuration information for QOE measurement; and wherein the third event is that the quality that is of the signal sent by the communication apparatus and that is obtained by the terminal device through measurement is lower than a fourth threshold.

11. The communication apparatus according to claim 9, wherein the instructions, when executed by the processor, cause the communication apparatus to:
receive indication information sent by the terminal device, wherein the indication information indicates that the terminal device has a measurement result to report, and the measurement result is obtained by the terminal device by performing QOE measurement based on the configuration information for QOE measurement; and
send configuration information of a first signaling radio bearer (SRB) to the terminal device, wherein the first SRB is used to send the measurement result.

12. The communication apparatus according to claim 11, wherein the instructions, when executed by the processor, cause the communication apparatus to:
receive the measurement result reported by the terminal device by using the first SRB.

13. The communication apparatus according to claim 9, wherein the first event comprises that the quality that is of the signal sent by the communication apparatus and that is obtained by the terminal device through measurement is lower than the first threshold.

14. The communication apparatus according to claim 9, wherein the first event comprises that the quality that is of the signal sent by the terminal device and that is obtained by the communication apparatus through measurement is lower than the second threshold.

15. The communication apparatus according to claim 9, wherein the first event comprises that the quality that is of the signal sent by the communication apparatus and that is obtained by the terminal device through measurement is lower than the first threshold, and the quality that is of the signal sent by the terminal device and that is obtained by the communication apparatus through measurement is lower than the second threshold.

16. The communication apparatus according to claim 9, wherein the first configuration information further indicates to a radio resource control (RRC) layer of the terminal device to determine, based on the second event, whether to send the configuration information for QOE measurement to an upper layer of the RRC layer.

17. The communication apparatus according to claim 9, wherein the first configuration information further indicates to the terminal device to determine, based on the second event, whether to perform QOE measurement based on the configuration information for QOE measurement.

18. A communication apparatus, comprising:
a processor; and
a non-transitory memory coupled to the processor, the non-transitory memory comprising instructions that, when executed by the processor, cause the communication apparatus to:
receive first configuration information sent by a first network device, wherein the first configuration information comprises configuration information for quality of experience (QOE) measurement, the first configuration information indicates a second event, and the second event is that a quality that is of a signal sent by a network device and that is obtained by the communication apparatus through measurement is lower than a third threshold;
when detecting the second event, send the configuration information for QOE measurement to an upper layer of a radio resource control (RRC) layer by using the RRC layer of the communication apparatus; and
perform QOE measurement based on the configuration information for QOE measurement at the upper layer of the RRC layer, to obtain a measurement result.

19. The communication apparatus according to claim 18, wherein the first configuration information further indicates a third event, and the third event is that the quality that is of the signal sent by the network device and that is obtained by the communication apparatus through measurement is lower than a fourth threshold; and
wherein the instructions, when executed by the processor, cause the communication apparatus to:
when the communication apparatus detects the third event, report the measurement result to a second network device.

20. The communication apparatus according to claim 18, wherein the instructions, when executed by the processor, cause the communication apparatus to:
send indication information to the first network device, wherein the indication information indicates that the communication apparatus has the measurement result;
receive configuration information that is of a first signaling radio bearer (SRB) and that is sent by a second network device;
set up the first SRB based on the configuration information of the first SRB; and
report the measurement result to the second network device by using the first SRB.

* * * * *